United States Patent
Colucci

(10) Patent No.: US 9,747,623 B2
(45) Date of Patent: *Aug. 29, 2017

(54) SYSTEM AND METHOD FOR BIDDING ON GROUPS OF FEE OR CONTINGENCY FEE-BASED MATTERS

(71) Applicant: Michele Colucci, Woodside, CA (US)

(72) Inventor: Michele Colucci, Woodside, CA (US)

(*) Notice: Subject to any disclaimer, the term of this patent is extended or adjusted under 35 U.S.C. 154(b) by 764 days.

This patent is subject to a terminal disclaimer.

(21) Appl. No.: 13/729,620

(22) Filed: Dec. 28, 2012

(65) Prior Publication Data

US 2014/0019289 A1    Jan. 16, 2014

Related U.S. Application Data

(63) Continuation-in-part of application No. 13/530,045, filed on Jun. 21, 2012, now abandoned, which is a continuation of application No. 12/467,220, filed on May 15, 2009, now abandoned, application No. 13/729,620, which is a continuation-in-part of application No. 11/740,256, filed on Apr. 25, 2007, now Pat. No. 8,359,241.

(60) Provisional application No. 61/053,624, filed on May 15, 2008.

(51) Int. Cl.
G06Q 30/06    (2012.01)
G06Q 30/08    (2012.01)

(52) U.S. Cl.
CPC ................................ *G06Q 30/0611* (2013.01)

(58) Field of Classification Search
CPC ................................ G06C 30/06; G06C 30/08
See application file for complete search history.

(56) References Cited

U.S. PATENT DOCUMENTS

| | | | |
|---|---|---|---|
| 6,988,138 B1 | 1/2006 | Alcorn et al. | |
| 7,069,308 B2 | 6/2006 | Abrams | |
| 7,117,254 B2 | 10/2006 | Lunt et al. | |
| 7,158,944 B1 | 1/2007 | Settle, III | |
| 7,188,153 B2 | 3/2007 | Lunt et al. | |
| 2002/0002469 A1 | 1/2002 | Hillstrom | |
| 2002/0038233 A1 | 3/2002 | Shubov et al. | |
| 2002/0069154 A1* | 6/2002 | Fields | 705/37 |

(Continued)

OTHER PUBLICATIONS

Cunningham, Thomas J., "Lending to Lawyers and Dealing with the Unique Collateral of Law Firm Receivables," The Secured Lender, New York, vol. 60, Iss. 1, p. 30, Jan./Feb. 2004.

(Continued)

*Primary Examiner* — James Zurita
(74) *Attorney, Agent, or Firm* — Sheppard, Mullin, Richter & Hampton LLP

(57) ABSTRACT

A system may comprise: a web server for posting matters of clients for bidding by contingency professionals; a client matter engine for enabling a particular client to post a particular group of related matters and to select a particular contingency professional bidding on the particular group of matters to handle the particular group of matters; a professional bidding engine for enabling the particular contingency professional to review at least a portion of the posted matters and to bid on the particular group of matters; and a bidding exchange engine for enabling the particular client and the particular contingency professional to communicate without exchanging direct contact information.

21 Claims, 17 Drawing Sheets

(56) References Cited

U.S. PATENT DOCUMENTS

| | | |
|---|---|---|
| 2002/0072930 A1 | 6/2002 | Scites |
| 2002/0133374 A1 | 9/2002 | Agoni et al. |
| 2002/0188483 A1 | 12/2002 | Fisher |
| 2003/0070167 A1 | 4/2003 | Holtz et al. |
| 2003/0158960 A1* | 8/2003 | Engberg ............... G06Q 20/02 709/237 |
| 2004/0019579 A1 | 1/2004 | Herz et al. |
| 2004/0103040 A1* | 5/2004 | Ronaghi et al. ............... 705/26 |
| 2004/0220823 A1 | 11/2004 | Brush et al. |
| 2005/0021750 A1 | 1/2005 | Abrams |
| 2005/0125346 A1 | 6/2005 | Winiecki |
| 2005/0222959 A1 | 10/2005 | Brager |
| 2005/0235062 A1 | 10/2005 | Lunt et al. |
| 2006/0036490 A1 | 2/2006 | Sagalyn |
| 2006/0080186 A1 | 4/2006 | Burchetta et al. |
| 2006/0116914 A1 | 6/2006 | Stemple |
| 2006/0271470 A1 | 11/2006 | McNamar et al. |
| 2007/0005750 A1 | 1/2007 | Lunt et al. |
| 2007/0244756 A1 | 10/2007 | Stucki |
| 2007/0265885 A1 | 11/2007 | Cox |
| 2007/0271138 A1 | 11/2007 | Van Der Linden et al. |
| 2008/0046315 A1 | 2/2008 | Axe et al. |
| 2008/0154634 A1 | 6/2008 | Willette et al. |
| 2008/0162323 A1 | 7/2008 | Menear et al. |
| 2008/0208717 A1 | 8/2008 | Suleymanov |
| 2008/0261181 A1 | 10/2008 | Kennedy et al. |

OTHER PUBLICATIONS

M2 Communications Ltd., "Lawyerboutique.Com: Lawyerboutique.Com, an Employment and Referral Site for Attorneys, Is Now Open!," M2 Presswire, Coventry, p. 1, Sep. 25, 2001.

Programmer bids.com, "Project: Legal Website: Connecting Buyers and Sellers," request for quote submitted Feb. 24, 2006 [retrieved online on Apr. 6, 2011 at http://rfq.programmingbids.com/cgi-bin/rfq/project.cgi?id=1140849452].

Programmer bids.com, Website: Programming Bids.com, Lakewood, Colorado [retrieved online on Aug. 27, 2007 at http://www.programmingbids.com].

PCT International Search Report and Written Opinion dated Aug. 19, 2008 for International Application No. PCT/US08/61287.

\* cited by examiner

| | I NEED A FREE LAWYER.COM "...DON'T TRY TO FIND A LAWYER - LET THEM FIND YOU!" | Welcome Back Joe • Home • Help • Signout |
|---|---|---|

| Your Profile | Your Case Details | Messages | Proposals | Case Progre |

YOUR CASE DETAILS

Please pay attention and provide clear details of your case, this will help the attorneys who will be browsing your case.
Click on a sub-category of your choice.

Accidents
Animal and Dog bites, Medical Mal Practise, Motor Vehicle,

Animal Bites

Appellate
Employment, Housing,

Asbestos
Assault, Battery, Cheque,

Civil Rights
Descrimination, Employment, Labour Law,

Construction Accidents
Adoption, Child Custody, Divorse

Criminal

Dangerous Products

Discrimination

Employee

Family Law

Immigration Law

Legal Malpractice

Libel / Slander

Maritime

Medical Malpractice

Military Claims

Railroad Accidents

Please note once you have selected a subcategory you won't be able to modify it later. So please pay attention Copyright © 2006 I Need A Free Lawyer. All rights reserved. | Disclaimer | Privacy Policy | Membership Agreeme

FIG. 10A

AUTOMOBILE

1. Brief description of what happened:
2. Your age:
3. Your sex (gender): (M or F)
4. Marital status:
5. Date of injury:
6. Did you file a police report (Yes or No)?
7. If Yes, did the police make a determination of what happened? (Please specify)
8. Have you had any medical expense yet (Yes or No)?
9. If Yes, how much?
10. Damage (in dollars) to your car:
11. Damage (in dollars) to the other car(s)?
12. Have you had any contact with the other driver, either insurance company (yours or the other driver's)?

MEDICAL MALPRACTICE

1. Brief description of what happened:
2. Date it occurred:
3. Your sex (gender):
4. Your age:
5. Marital status:
6. Have you contacted the doctor/hospital yet (Yes or No)?
7. If Yes, what did the doctor or hospital say?
8. Result of malpractice (e.g., person died, permanently disabled, traumatized, implants exploded, cancer spread):

WORKERS' COMPENSATION

1. Brief description of what happened:
2. Brief description of the injury:
3. Date it occurred:
4. Your age:
5. Your sex (gender):
6. Is there a Workers Compensation Incident report?
7. Medical expenses to date:
8. Medical prognosis (i.e., what do the doctors say regarding your injuries and how they may change/stay the same in the future?):
9. Time lost from work thus far:

FIG. 11A

SECURITIES CASES

1. Brief description of the problem:
2. Dollar amount lost:
3. Your age:
4. Your sex (gender):
5. Marital status:
6. Brokerage firm involved:

SETTLED CASES/JUDGEMENTS

1. Date of judgement/settlement:
2. Location (Court):
3. Type of case (e.g., car accident, medical malpractice):
4. Dollar amount of judgment:
5. Any efforts to date toward collecting the judgment:
6. Were you represented by an attorney (Yes or No)?

CONTRACTOR CASES

1. Brief description of the problem:
2. Dollar amount of damage so far:
3. Was there a written contract?
4. State where you live:

CRIMINAL CASES

1. Nature of crime:
2. Damage caused to you:
3. Your age:
4. Your sex (gendeR):
5. State where you live:
6. Date of occurrence/damage:
7. Have you done anything yet?

CIVIL RIGHTS/DISCRIMINATION

1. Brief description of problem:
2. Injury/damage sustained as a result:
3. Approximate dollar value you assign to the damage/injury you sustained:
4. Your age:
5. Your sex (gender):
6. State where you live:

FIG. 11B

EMPLOYMENT CASES

1. Brief description of problem:
2. Injury/damage sustained as a result:
3. Approximate dollar value you assign to the damage/injury you sustained:
4. Your age:
5. Your sex (gender):
6. State where you live:

CONTRACTS CASES

1. What was the contract for?
2. How was it breached (i.e., not performed)
3. What is the nature of your damages?
4. What is the dollar amount of your damage?
5. Your age:
6. Your sex (gender):
7. Did you write the contract?

REAL ESTATE

1. Nature of the problem:
2. What type of damage did you sustain?
3. Damage in dollars:
4. Date of problem:
5. Your age:
6. Your sex (gender):
7. Location of property (city, state):

OTHER CASES (e.g., Family Law, Finance, Immigration, Taxes, Traffic)

1. Brief description of the problem:
2. Date it occurred:
3. Damage sustained as a result:
4. Monetary value of damage:
5. Your age:
6. Your sex (gender):

FIG. 11C

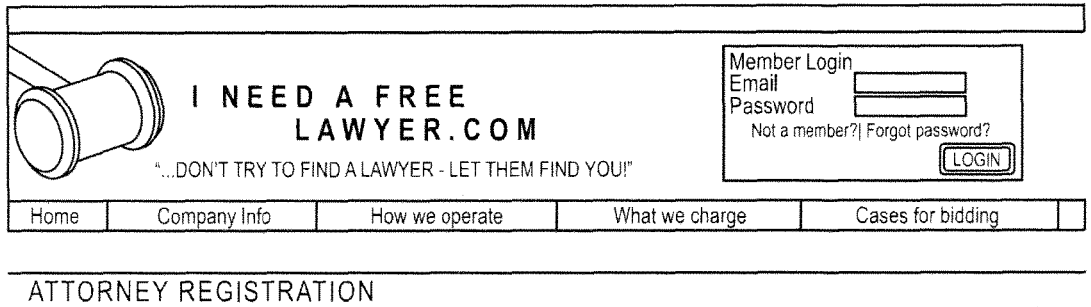

ATTORNEY REGISTRATION

Welcome to INeedAFreeLawyer.com - a new website designed exclusively to match clients with lawyers who will take their cases contingency fee. You may ask clients about their cases in our chat rooms, provided no personal information is exchanged. You also bid less than the standard 33% before trial, 40% after trial should you wish to do so.

By joining our service, you agree to:

- Pay minimal usage fees (below); and
- To enforce our lien, signed by the client, for 3% of any judgment or settlement you receive on behalf of the client.

We have several membership options as outlined below. Thanks for joining!

MULTIPLE ATTORNEYS: Multiple attorney registrations qualify for the following discounts:
5-10 attorneys = 10% discount
11+ attorneys = 20%
Your discount will be automatically applied at checkout if you register more than 5 attorneys

---

Silver Membership - Includes access to all cases posted in three major categories.

As a Sliver Member you will be able to:

Number of Registrants [1]
- Review cases posted by subject matter or by date entered.
- Communicate and ask questions to prospective clients about their case.
- Bid on cases you see posted on our website.

[Submit]

1205

---

Gold Membership - Includes access to all cases posted in all categories.

As a Gold Member you will be able to:

Number of Registrants [1]
- Review cases posted by subject matter or by date entered.
- Communicate and ask questions to prospective clients about their case.
- Bid on cases you see posted on our website.

Plus +
- Enjoy an extended sheet to detail information regarding the cases won.

[Submit]

1210

---

Platinum Membership - Includes access to all cases posted in all categories.

As a Platinum Member you will be able to:

Number of Registrants [1]
- Review cases posted by subject matter or by date entered.
- Communicate and ask questions to prospective clients about their case.
- Bid on cases you see posted on our website.

Plus +
- Enjoy an extended sheet to detail information regarding the cases won.
- Receive automatic emails when a case has been posted that fits your search criteria.

[Submit]

I NEED A FREE LAWYER.COM
"...DON'T TRY TO FIND A LAWYER - LET THEM FIND YOU!"

Member Login
Email
Password
Not a member?| Forgot password?
[LOGIN]

| Home | Company Info | How we operate | What we charge | Cases for bidding | H |

---

HELP

CONTACT INFORMATION: Should you have further questions, please click on the appropriate link:

- Technical Questions —1405
- Content Questions —1410
- Legal Questions —1415

| LEGAL DICTIONARY: | LAWYER CHECK |
|---|---|
| If you find yourself unfamiliar with a term used in this website or with a word that an Attorney has used, enter the word here to see if it's in our legal dictionary:<br><br>[        ] [Search] | If you have received the name/contact information of the Attorney you chose, before you contact them, click here to check their record with the State Bar Association where they practice.<br>SELECT A STATE:<br>[Alabama ▼] [Go] |

SYSTEM AND METHOD FOR BIDDING ON GROUPS OF FEE OR CONTINGENCY FEE-BASED MATTERS

CROSS-REFERENCE

This application is a continuation-in-part of U.S. patent application Ser. No. 13/530,045, filed Jun. 21, 2012 and entitled "System and Method for Website Monetization," which is a continuation of U.S. patent application Ser. No. 12/467,220, filed May 15, 2009 and entitled "System and Method for Website Monetization," now abandoned, which claims priority to U.S. Provisional Patent Application Ser. No. 61/053,624, filed May 15, 2008 and entitled "System and Method for Blog Monetization." This application is also a continuation-in-part of U.S. patent application Ser. No. 11/740,256, filed Apr. 25, 2007 and entitled "System and Method for Bidding on Contingency-Based Matters." All of the above-referenced applications are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to electronic commerce, and more particularly provides a system and method for bidding or requesting fee proposals on contingency-based matters between clients and professionals, e.g., lawyers and judgment collectors.

BACKGROUND

Professional, e.g., legal or collection, services are typically rendered subject to payment up-front and/or based on hours worked, regardless of whether a client obtains a successful outcome. For example, a collection agency is typically paid regardless of whether they obtain payment on behalf of a creditor.

Contingency professionals, e.g., including but not limited to contingency lawyerslaw firms offering contingency fee arrangements or hybrid fee arrangements, collection agencies or collection practitioners provide professional services on a full or partial contingency basis e.g., agree to be paid nothing, only a portion of their fees, only costs, and/or the like, unless the client recovers, or take at least part of their fee in this manner. Typically, a contingency-based payment includes a percentage of the client's recovery. Many prospective clients are unfamiliar with contingency-based services and unaware how to locate a professional willing to take their case(s) on contingency.

Systems and methods are needed that enable prospective clients to locate contingency professionals worldwide. Further, systems and methods are needed to enable contingency professionals to make an offer or compete for a prospective client's business.

SUMMARY

A system may comprise: a web server for posting matters of clients for requesting fee proposals or for bidding by contingency professionals or law firms that offer contingency, fee or hybrid fee arrangements; a client matter engine for enabling a particular client or group of clients to post a particular group of matters and to select a particular contingency professional making offers for, or bidding on, the particular group of matters to handle the particular group of matters; a professional bidding engine for enabling the particular contingency professional to review at least a portion of the posted matters and to make an offer or bid on the particular group of matters; and an offer or bidding exchange engine for enabling the particular client and the particular contingency professional to communicate without exchanging direct contact information.

In some embodiments, the particular group of matters may comprise a set of matters that are not cost-effective for the contingency bidding professional to handle individually but are cost effective for the contingency bidding professional to handle together. In some embodiments, the particular group of matters may comprise a particular group of legal matters. In some embodiments, the particular group of matters may involve researching of common legal issues. In some embodiments, the particular group of matters may involve interfacing with common adverse parties. In some embodiments, the particular group of matters may involve resolving common case management issues. In some embodiments, the particular group of matters may involve discovery of common factual issues, witnesses, or documents. In some embodiments, the particular group of matters may involve investigation or presentation of common witnesses. In some embodiments, the particular group of matters may involve interfacing with common judges. In some embodiments, the particular group of matters may involve use of common expenditures. In some embodiments, the particular group of matters may be located in particular geographical areas. In some embodiments, the particular group of matters may be related by case type. In some embodiments, the particular group of matters may be all matters pending for a particular client or company In some embodiments, the particular group of matters may enable a client to aggregate all outside matters in one location or with one practitioner or group of practitioners; In some embodiments, the particular group of matters may reduce various types of in house company liability. In some embodiments, the particular group of matters may be grouped for strategic purposes. In some embodiments, the particular group of matters may be grouped to contain costs. In some embodiments, the particular group of matters may not be related at all.

Contingency fee professionals or their Companies may choose to bid or put forth their fee proposals for various reasons. In some embodiments, the contingency fee professionals may wish to bid for the opportunity to have consistent work; In some embodiments, the contingency fee professionals may wish to bid for matters to enable them to start or sustain a new practice. In some embodiments, the contingency fee professionals may wish to bid to create a relationships with a client that they do not currently have or solidify a relationship they do currently enjoy; In some embodiments, the contingency fee professionals may wish to bid for cases to open a new office location. In some embodiments, the contingency fee professionals may wish to bid for cases because it is cost efficient for their practice to have more work. In some embodiments, the contingency fee professionals may wish to bid for cases because they'd like to establish an expertise or proficiency in a particular area or build on that expertise. In some embodiments, the contingency fee professionals may wish to bid for matters to obtain greater flexibility in their work hours or location.

A method may comprise: posting matters of clients to obtain offers or for bidding by contingency professionals; enabling a particular client to post a particular group of related or unrelated matters and to select a particular contingency professional or contingency law firm providing offers or bidding on the particular group of matters to handle the particular group of matters; enabling the particular contingency professional or law firm to review at least a portion of the posted matters and to bid on the particular group of matters; and enabling the particular client and the particular contingency professional or law firm to communicate without exchanging direct contact information.

In some embodiments, the particular group of matters may comprise a set of matters that are not cost-effective for the contingency bidding professional to handle individually but are cost effective for the contingency bidding professional to handle together. In some embodiments, the particular group of matters may comprise a particular group of legal matters. In some embodiments, the particular group of matters may involve researching of common legal issues. In some embodiments, the particular group of matters may involve interfacing with common adverse parties. In some embodiments, the particular group of matters may involve resolving common case management issues. In some embodiments, the particular group of matters may involve discovery of common factual issues, witnesses, or documents. In some embodiments, the particular group of matters may involve investigation or presentation of common witnesses. In some embodiments, the particular group of matters may involve interfacing with common judges. In some embodiments, the particular group of matters may involve use of common expenditures. In some embodiments, the particular group of matters may be grouped for internal or external strategic purposes. In some embodiments, the reasons for the grouping of a particular group of matters may not be ascertainable.

A system may comprise: means for posting matters of clients for making offers or bidding by contingency professionals; means for enabling a particular client to post a particular group of matters and to select a particular contingency professional or firm making an offer for, or bidding on, the particular group of matters to handle the particular group of matters; means for enabling the particular contingency professional or firm to review at least a portion of the posted matters and to make offers for, or bid on, the particular group of matters; and means for enabling the particular client and the particular contingency professional to communicate without exchanging direct contact information. Bidding may include different fee arrangements e.g. pure contingency fees; partial contingency fees; provisions for how case costs will be paid; full hourly fees; fees that scale up or down according to the amount recovered or the time within which it is recovered; fee arrangements based on the attainment of certain milestones in the case; etc.

BRIEF DESCRIPTION OF THE DRAWINGS

FIGS. 10A-11B are screen-shots illustrating an example user interface for assisting a client to categorize a matter, in accordance with an embodiment of the present invention.

FIGS. 11A-11C is a list illustrating example requests for information to assist a client with describing a matter, in accordance with an embodiment of the present invention.

FIG. 12 is a screen-shot illustrating an example user interface for registering a lawyer, in accordance with an embodiment of the present invention.

FIG. 14 is a screen-shot illustrating an example user interface for administrative functions of the web site, in accordance with an embodiment of the present invention.

DETAILED DESCRIPTION

The following description is provided to enable any person skilled in the art to make and use the invention and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

Figure 1:
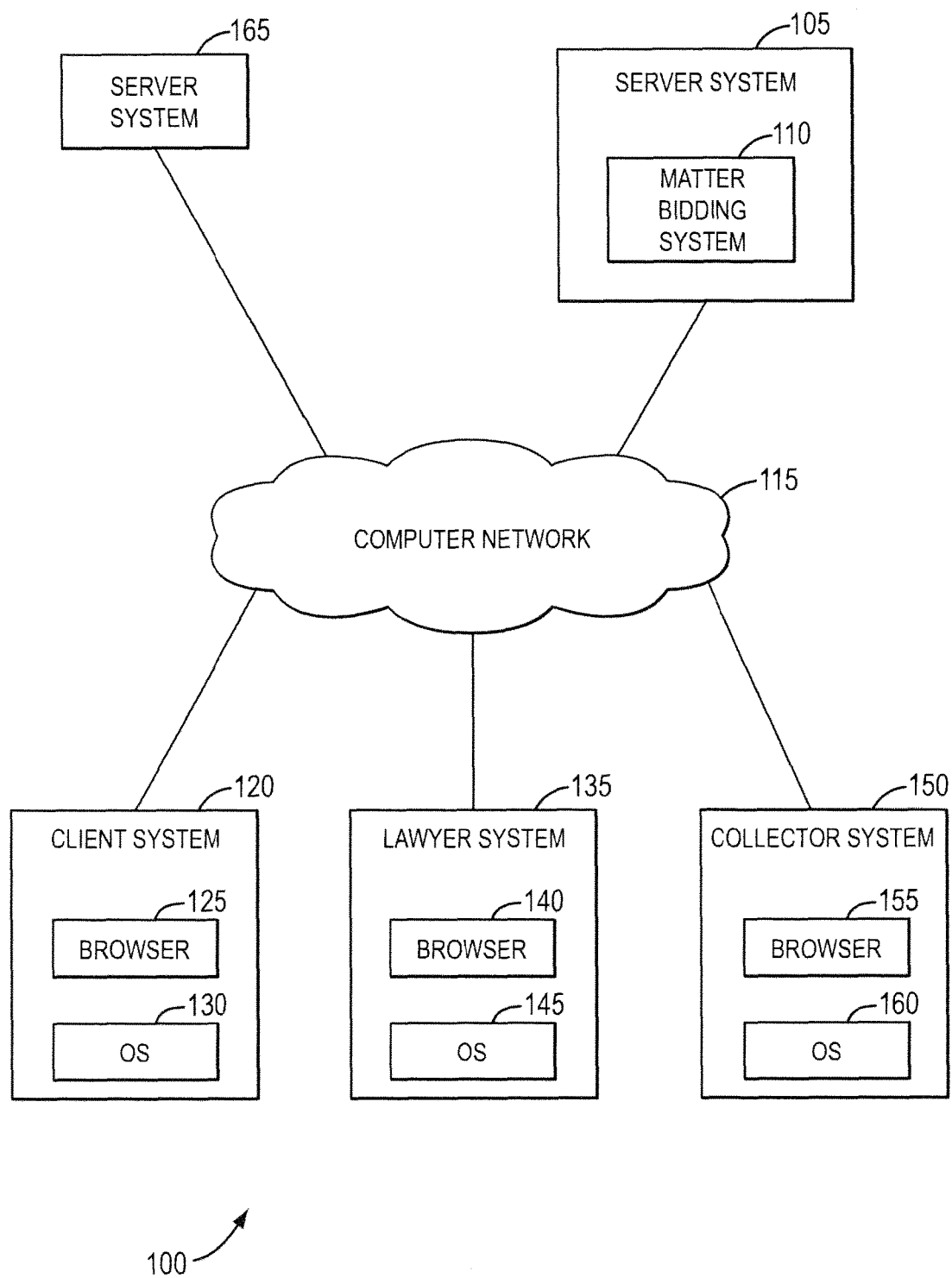
FIG. 1 is a block diagram of a network system incorporating a matter bidding system, in accordance with an embodiment of the present invention.

FIG. 1 is a block diagram of an example network system 100, in accordance with an embodiment of the present invention. Network system 100 includes a server system 105 coupled via a computer network 115 to a client system 120, a lawyer system 135, and a collector system 150. The server system 105 may include any computer system or network. The network system 100 may include additional servers, such as server system 165. Although the network system 100 is described with reference to bidding for legal services, e.g., lawyer and judgment collector services, one skilled in the art will recognize that the network system can operate to facilitate bidding for other professional services, e.g., other contingency-based services.

The server system 105 includes hardware, software and/or firmware that manages the general web pages of a matter bidding system 110. The matter bidding system 110 enables clients with a matter, e.g., legal or otherwise, to register, to post the matter, to engage in a bidding process with interested professionals, e.g., contingency lawyers and/or judgment collectors (or "collectors"), to view the status of their matter, etc., via the computer network 115. The matter bidding system 110 also enables professionals, e.g., contingency lawyers and collectors, to register and bid on matters posted by clients. Although the matter bidding system 110 is illustrated as hosted and managed by the server system 105, other embodiments may provide all or some portions of the matter bidding system 110 on another server, e.g., on the server system 165. The matter bidding system 110 is described in further detail with reference to FIG. 2.

The client system 120 includes a browser 125 and an operating system (OS) 130. The browser 125 is operative to receive content from the web server 110 via the computer network 115 and to display the content to the user, e.g., the client, of the client system 120. The browser 125 may, for example, display a user interface for requesting profile information to become a registered user of the server system 105. The OS 130 is a set of computer programs for managing hardware and software resources of the client system 120. The OS 130 may include Windows (e.g., Windows 2000, Windows XP), Linux, Mac OS, or the like.

The lawyer system 135 includes a browser 140 and an OS 145, and the collector system 150 includes a browser 155 and an OS 160. Using the browser 140, the lawyer may review posted matters, communicate with prospective clients, make bids, etc. Using the browser 155, the collector may review posted matters, may communicate with prospective clients, make bids, etc. The browser 140 and browser 155 may be substantially similar to the browser 125, and the OS 145 and OS 160 are substantially similar to the OS 130.

The computer network 115 may be any network. Examples may include the Internet, an intranet, a local area network (LAN), a wide area network (WAN), a campus area network (CAN), a metropolitan area network (MAN), and any combination thereof.

Figure 2:
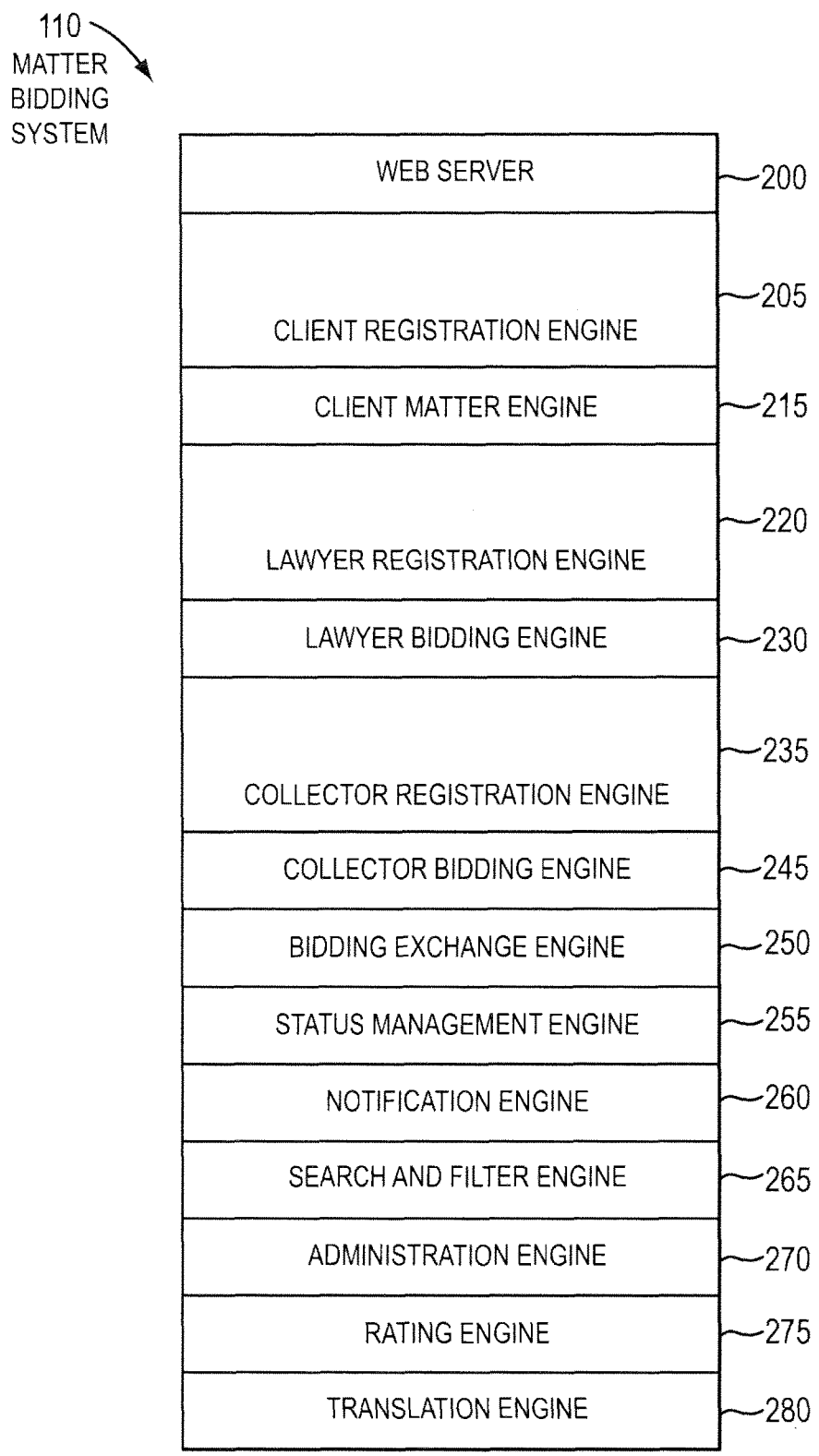
FIG. 2 is a block diagram illustrating details of the matter bidding system, in accordance with an embodiment of the present invention.

FIG. 2 is a block diagram illustrating details of the matter bidding system 110, in accordance with an embodiment of the present invention. The matter bidding system 110 includes a web server 200, a client registration engine 205, a client matter engine 215, a lawyer registration engine 220, a lawyer bidding engine 230, a collector registration engine 235, a collector bidding engine 245, a bidding exchange engine 250, a status management engine 255, a notification engine 260, a search and filter engine 265, an administrative engine 270, a rating engine 275, a translation engine 280, and/or the like. In one embodiment, the client registration engine 205, the lawyer registration engine 220 and the collector registration engine 235 are components of a general registration engine. In one embodiment, the client matter engine 215, the lawyer bidding engine 230, the collector bidding engine 245 and the bidding exchange engine 250 are components of a general bidding engine.

In one embodiment, the web server 200 is a software application adapted to communicate data to and from the client, lawyer, and collector systems 120, 135, 150. The user of the system 120, 135, 150 may communicate data, e.g., client data associated with the client, lawyer data associated with the lawyer, collector data associated with the collector, and matter data associated with the matter to the web server 200.

The client registration engine 205 includes hardware, software and/or firmware for registering clients. Clients may include individuals or entities with legal matters, with judgments not yet collected, involved in pending lawsuits (as plaintiff or defendant), anticipating being sued, and/or otherwise interested. Examples of data that the client registration engine 205 may ask a client to provide include screen name (e.g., nickname or first name), legal name, one or more telephone numbers (e.g., home, work, mobile), fax number, email address, mailing address, gender, social security number, date of birth, etc. If the client is a business entity, examples of data that the client registration engine 205 may ask the entity to provide include the business name, mailing address (including street and/or post office box address), taxpayer ID, state of registration or licensing (if any), name and title of principal, etc.

The client registration engine 205 may be adapted to display and prompt the client to agree to operator terms and conditions. Client agreement to the terms and conditions may be made online, such as by ticking a box or by typing in "Yes," "I agree," or "I understand." The client registration engine 205 may be adapted to enable the client, upon having agreed to the terms and conditions, to set up account login information, such as username and password. This process may include verifying that the selected username is available, e.g., not already in use by another registered user.

In one embodiment, the terms and conditions to which the client may need to agree include a privacy policy, a standard contingency fee payable to a contingency professional whose bid is selected (i.e., the "winning professional"), and/or a contingency fee payable to the operator of the web server 105 (the "operator"). The contingency fee payable to the operator may be secured by a lien on a matter that the client posts and that results, directly or indirectly, in a monetary recovery to a client. The terms and conditions may define the contingency fee payable to the operator as a referral fee, e.g., if a lien is not allowed in a particular jurisdiction. In one embodiment, the standard contingency fee payable to the winning lawyer may be 33% of any recovery prior to trial, 40% of any recovery upon going to trial, plus the winning lawyer's expenses (e.g., court filing fees, messenger services, copies, mileage, etc.). Expenses may be subject to a maximum, such as 5% of the total amount recovered. The contingency fee payable to the operator may be 3%. In the event that collection is subject to a due date, such as the client's preferred date by which to have the funds, the standard contingency fee may include more than one percentage (e.g., one percentage if the collector meets the preferred date, and another, lower, percentage if the collector does not meet the preferred date). In some embodiments, the percentages due to the operator, winning lawyer and/or winning collector may be computed prior to deduction of expenses (incurred by the winning lawyer and/or collector). In other embodiments, such percentages may be computed following deduction of expenses. Bidding may include different fee arrangements e.g. pure contingency fees; partial contingency fees; provisions for how case costs will be paid; full hourly fees; fees that scale up or down according to the amount recovered or the time within which it is recovered; fee arrangements based on the attainment of certain milestones in the case; etc.

The client matter engine 215 includes hardware, software and/or firmware for enabling a client to post a matter. As used herein, a matter may refer to a single matter. A matter may also refer to a group of related matters. More specifically, the client may have a group of matters that are not cost-effective for an attorney to handle individually but are cost-effective for an attorney to handle as a group. As a result, the group of matters as a whole may have higher dollar recovery prospects as the attorney's work on one individual case may help the attorney handle the other cases in the group efficiently. For instance, the group of matters may involve one or more of: researching of common legal issues, interfacing with common adverse parties, resolving common case management issues, discovery of common factual issues, witnesses, and/or documents, investigation and/or presentation of common witnesses, interfacing with common judges, use of common expenditures, and other prospects that allow the group of matters to be handled more cost effectively than the individual matters in the group. In such a case, the client matter engine 215 may enable the client to post the group of matters. The client matter engine 215 is adapted to guide the client to provide sufficient relevant matter data to enable a professional, e.g., a registered lawyer or registered collector, to bid on the matter or group of matters.

In some embodiments, the particular group of matters may be located in particular geographical areas. In some embodiments, the particular group of matters may be related by case type. In some embodiments, the particular group of matters may be all matters pending for a particular client or company In some embodiments, the particular group of matters may enable a client to aggregate all outside matters in one location or with one practitioner or group of practitioners; In some embodiments, the particular group of matters may reduce various types of in house company liability. In some embodiments, the particular group of matters may be grouped for strategic purposes. In some embodiments, the particular group of matters may be grouped to contain costs. In some embodiments, the particular group of matters may not be related at all.

Contingency fee professionals or their Companies may choose to bid or put forth their fee proposals for various reasons. In some embodiments, the contingency fee professionals may wish to bid for the opportunity to have consistent work; In some embodiments, the contingency fee professionals may wish to bid for matters to enable them to start or sustain a new practice. In some embodiments, the contingency fee professionals may wish to bid to create a relationships with a client that they do not currently have or solidify a relationship they do currently enjoy; In some embodiments, the contingency fee professionals may wish to bid for cases to open a new office location.

In some embodiments, the contingency fee professionals may wish to bid for cases because it is cost efficient for their practice to have more work. In some embodiments, the contingency fee professionals may wish to bid for cases because they'd like to establish an expertise or proficiency in a particular area or build on that expertise. In some embodiments, the contingency fee professionals may wish to bid for matters to obtain greater flexibility in their work hours or location. In some embodiments, the particular group of matters may be grouped for internal or external strategic purposes. In some embodiments, the reasons for the grouping of a particular group of matters may not be ascertainable. In one embodiment, client matter engine 215 requests the client to select a case category. The case category may be selected from a list of case categories provided in layman's terminology. As shown in FIG. 10A, the list may include "Accidents," "Animal bites," "Appellate," "Asbestos," "Civil rights," "Construction accidents," "Criminal," "Dangerous products," "Discrimination," "Employee," "Family law," "Immigration law," "Legal malpractice," "Libel/slander," "Maritime," "Medical malpractice," "Military claims," "Railroad accidents," and the like. Depending on the category selected by the client, the client may be requested to select a sub-category. For example, upon selecting the category "Accidents," the client may be prompted to select one of "Animal and dog bites," "Motor vehicle," and "Medical malpractice." Depending on the sub-category selected, the client may be requested to select a sub-sub-category, and so forth. Sub-sub-categories to the sub-category "Motor vehicle" may include, for example, "Passenger," "Driver," and "Pedestrian." In some embodiments, the case categories and/or sub-categories may be presented as brief sentences. Examples may include "A contractor I hired didn't do his job" and "My stock broker lost my money."

Figure 10B:
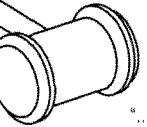

In one embodiment, the client matter engine 215 may also be adapted to prompt the client to provide a brief case description in free form text, as shown in FIG. 10B. The client matter engine 215 may be adapted to prompt the client to select a jurisdiction of the other party (e.g., the state in which defendant lives), the jurisdiction of the injury or case (e.g., the state in which the motor vehicle accident took place), an estimated value of the case (e.g., in U.S. dollars), etc. The client may be prompted to input case identifiers, e.g., a name or number, such as a case name, docket number, case number, court identifier, judgment identifier, etc. Case-identifying or party-identifying information may not be published until the professional is selected.

In one embodiment, the client matter engine 215 may be adapted to display content that includes a predefined set of questions. Such predefined set of questions may be context based, e.g., the set may differ depending on the case category and/or case sub-categories selected. For example, if the client is posting a legal matter (i.e., a matter intended for a registered lawyer to bid on) and selects "Accident" and then "Motor vehicle" as sub-category, the client may be prompted to provide input data to one or more of the following questions: "Date of injury," "Did you file a police report (Yes/No)?" "If so, did the police make a determination of what happened (Yes/No)?" "If so, please specify," "Have you had any medical expenses yet (Yes/No)?" "If so, how much?" "How much was the damage to your car (in dollars)?" "How much was the damage to the other car (in dollars)?" "Have you had any contact with the other driver, with your insurance company, or with the other driver's insurance company (Yes/No)?" "If so, what did the other driver or the insurance company say?" FIGS. 11A to 11C illustrate example sets of questions based on case category.

If the client is posting a judgment matter for a collector to bid on, the client matter engine 215 may prompt the client to provide matter data in response to one or more of the following questions: "Date of judgment or settlement," "Location (court)," "Type of case" (in response to which the client may be able to select from a predefined list or input a free format response, such as "car accident," "medical malpractice," etc.), "Any efforts to date toward collecting the judgment (Yes/No)?" (optionally requesting also a brief explanation), "Were you represented by an attorney (Yes/No)?"

In one embodiment, the client matter engine 215 enables the client to upload a file (e.g., a Word or PDF document), e.g., a judgment, a settlement agreement, a document filed in court by the client, on the client's behalf, or by a party adverse to the client. Such information may be maintained in confidence until a winning professional is selected.

Some embodiments of the server system 105 are adapted to enable the client to browse the site without registering, and enable the client to post a matter only after registering.

Others may be adapted to enable the client to submit a matter for posting before or after registering. Enabling a client to submit a matter prior to registering may be advantageous to capture indecisive clients. The server system 105 may not post submitted matters by unregistered clients until they register.

Further, in some embodiments, the client matter engine 215 may enable access to a private bulletin board, private email system, or the like to enable the client to communicate with bidding lawyers regarding the matter, without disclosing direct contact information. In one embodiment, the client matter engine 215 may communicate via the bidding exchange engine 250, described below, to ensure that direct contact information is not shared.

If a client abandons a matter or never selects a lawyer, some embodiments of the client matter engine 215 may be adapted to impose restrictions on re-posting of matters. For example, the client matter engine 215 may restrict re-postings to once per month, once per 30-day window, and/or the like. Alternatively, the client matter engine 215 may require an explanation why the matter is being re-posted.

The client matter engine 215 is further adapted to enable a client to select a particular lawyer among lawyers bidding on the client's matter and to commit to that particular lawyer's bid. In one embodiment, the client matter engine 215 is adapted to prompt the client to print, sign, and mail/email/fax an agreement to the current terms and conditions to the operator before the winning lawyer's direct contact information is shared. The current terms and conditions may include substantially the same terms and conditions that may have been required for registration as a user. In addition, client matter engine 215 may prompt the client to sign a letter of instructions to the winning lawyer, recognizing the lien for the operator's percentage of any recovery.

Upon receipt of such documents, and any required documents from the winning lawyer (as described with reference to the lawyer bidding engine 230), the client matter engine 215 (or the bidding exchange engine 250 described below) may be adapted to disclose direct contact information, e.g., telephone numbers, email addresses, street addresses, etc., of the winning lawyer and the client. The direct contact information may be in the form of a passcode or link to the winning lawyer's direct contact information including parts or all of the winning lawyer's profile and credentials. In one embodiment, the winning lawyer's contact information is provided to the client first, so that the client can conduct diligence on the lawyer prior to a lawyer selection confirmation. In one embodiment, the client matter engine 215 allows the client to reject his or her selection of the winning lawyer only if certain conditions are noted, e.g., if the lawyer is in poor standing with the bar, if the lawyer presented an false statements, etc.

The lawyer registration engine 220 includes hardware, software and/or firmware for registering lawyers. Lawyers may include solo practitioners, attorneys practicing within a law firm, in-house counsel, other individuals eligible to practice law in the jurisdiction of the matter on which they are bidding, and/or otherwise authorized users of the server system 105. The lawyer registration engine 220 may ask the lawyer to provide similar information to that of the client, as described with reference to the client registration engine 205. The lawyer registration engine 220 may be further adapted to prompt the lawyer to provide professional data including bar registration number, jurisdiction of admission to practice law, law firm name, law firm mailing address, and law firm taxpayer identification number.

The lawyer registration engine 220 may be adapted to prompt the lawyer for input data associated with the lawyer's credentials. Credentials may include years of experience, practice areas, client trust account number, resume, year of admission to the bar, years in practice, general region in which the lawyer operates (e.g., Northern U.S., Western U.S.), dollar amounts of judgments and/or settlements in the past, statistics or numbers of cases handled in a particular practice area and/or cases won or otherwise concluded with a favorable outcome (e.g., settled), and other notes and comments on licensure, eligibility to practice, experience, education, and why a user should select the lawyer's bid (e.g., the lawyer's 'pitch'). The lawyer's pitch may also include a contingency-based fee offer that may be different than the standard contingency fee.

In one embodiment, the lawyer registration engine 220 may be adapted to accept data associated with credentials via one or more predefined sets of responses. Such embodiment may be advantageous in terms of eliminating the ability for lawyers to provide data that might otherwise enable the client and/or lawyer to contact each other separately, thus circumventing the bidding process. Example requests for information may include one or more of the following: "Number of years in practice" to which the lawyer may select one of "1-5," "5-10," "10-15," "15-20" and "20+", "Practice areas" to which the lawyer may select one or more practice areas from a predefined list including, for example, "Securities matters," "Criminal defense," "Tort actions," etc., "Number of cases handled in this area." These questions may be repeated for each selected practice area. The predetermined set of responses may include: "Fewer than 10," "10-50," and "50+." "Percentage of cases with a favorable recovery" may enable the lawyer to select from "1-10%," "10-20%," . . . "90-100%." "General location" may enable the lawyer to select one of "Northern U.S.," "Western U.S.," "Southern U.S.," and "Eastern U.S."

The lawyer registration engine 220 may be adapted to require the lawyer to agree to the operator's terms and conditions. Such agreement may be to a privacy policy, to fees payable to the operator, to a lien in favor of the operator securing the operator's fees, and to charging any client standard contingency fees as defined by the operator. The terms and conditions may specify standard contingency fees for the lawyer or less, standard contingency fees for the operator, membership fees, etc. In one embodiment, there may be no lawyer membership fees imposed. Alternatively, membership fees may be based on various levels, e.g., silver membership, gold membership, platinum membership, etc. Membership level may affect the years of membership, the contingency percentages to the operator, etc. The terms and conditions may further include provisions that if the lawyer subsequently refers a matter to another attorney, the terms and conditions, including the lien, become binding on the other attorney. Further, the terms and conditions may include provisions that the lawyer, upon receipt of any recovery, will pay the operator prior to the client. Further, the terms and conditions may specify that a professional may refer a matter to another attorney only under certain conditions.

One embodiment may include four membership types, such as a one-year, a two-year, a three-year, and a four-years-plus membership. The two-, three-, and four-years-plus memberships may include a discount for an initial term, such as the first year free. The three- and four-years-plus memberships may include discounted annual fees, such as $75 per year for the three-year membership with the first year free (i.e., $150 total for three years), and $50 per year for the four-years-plus membership with the first year free (i.e., $200 for four years, $250 for five years, etc.). Other membership structures are possible.

In some embodiments, the lawyer registration engine 220 may provide the lawyer the option to pay on-line, such as using a credit card, PayPal® or the like. Other embodiments may include options to pay via mail, e.g., by mailing a check to an address provided (e.g., the operator's mailing address). In some embodiments, the lawyer registration engine 220 may not enable the lawyer to bid until the lawyer's payment made is confirmed and/or cleared.

The lawyer registration engine 220 enables the lawyer to set up login information, such as username and password.

The lawyer bidding engine 230 includes hardware, software and/or firmware for enabling a registered lawyer to examine posted matters. In some embodiments, the lawyer bidding engine 230 may also enable a lawyer to request additional information from the client. In one embodiment, the lawyer bidding engine 230 may communicate with the client via the bidding exchange engine 250, described below, to ensure that direct contact information is not shared. The lawyer bidding engine 230 enables the lawyer to submit a bid to the client for client review and possible selection. A bidding lawyer's bid may include information of a marketing type, e.g., the bidding lawyer's pitch to the client as to why the client should select the bidding lawyer to handle the matter. In one embodiment, the bidding lawyer's bid does not include monetary information. The bid may be for a matter. In some embodiments, the lawyer may bid for a group of matters that are more efficient to handle as a group than the individual matters in the group of matters.

After bidding for a matter, the lawyer bidding engine 230 may be adapted to prompt the lawyer to print, sign, and mail or fax the current terms and conditions to the operator. The current terms and conditions may include substantially the same terms and conditions as described with reference to the lawyer registration engine 220. In addition, the registered lawyer may need to sign lien documents, including acknowledgment of receipt of the client's letter of instructions and a letter of protection acknowledging the operator's lien against any recovery. The letter of protection and/or any other lien document may vary depending on jurisdiction. The lawyer bidding engine 230 may be adapted to provide a link to the applicable state's lien document.

In some embodiments, if the registered lawyer wishes to make a bid that does not conform to the operator's terms and conditions, the registered lawyer may need to obtain prior approval from the operator. For example, prior approval may be needed when a bid higher than the standard contingency percentage is desired. In some embodiments, prior approval may not be necessary, e.g., for contingency percentage bids lower than the standard contingency percentage.

The collector registration engine 235 includes hardware, software and/or firmware for registering collectors. Collectors may include anyone, e.g., a collection agency, capable of pursuing payment of a debt owed by creditor. A collector may be asked to provide similar data as that of a lawyer, as described with reference to the lawyer registration engine 220. The collector registration engine 235 may be adapted to request data including collection agency name, agency registration number (e.g., license or bond number), jurisdiction of registration, mailing address, taxpayer ID, etc. The collector registration engine 235 may be adapted to request collector trust account number and other fiduciary information. The collector registration engine 235 may also request the collector to agree to the operator's terms and conditions. In one embodiment, the terms and conditions are similar to those of the lawyer's terms and conditions. For example, the terms and conditions may include lien documents, such as acknowledgment of receipt of the client's letter of instructions (to the winning collector) and a letter of protection acknowledging the operator's lien against any recovery by the winning collector.

The collector bidding engine 245 includes hardware, software and/or firmware for enabling a collector to view available matters, to communicate with the client for additional information (e.g., via the bidding exchange engine 250 to ensure that direct contact information is not shared), and to bid on a matter. The collector bidding engine 245 is substantially similar to the lawyer bidding engine 230. The collector's bid, like the lawyer's bid, may include the collector's pitch. The collector, like the lawyer, may be required to provide a signed copy of the current terms and conditions to the operator, possibly as a pre-requisite to committing to a bid.

The bidding exchange engine 250 includes hardware, software and/or firmware for enabling communication between a client and a professional, possibly as part of the bidding process. For example, as part of reviewing a matter, a lawyer or collector may wish to ask the client a question, e.g., for additional matter data. Similarly, the client may ask the professional a question, e.g., for lawyer credentials, availability, and/or the like. The bidding exchange engine 250 is adapted to ensure that direct contact information is not shared, whether intentionally or inadvertently.

In some embodiments, the bidding exchange engine 250 provides a bulletin board for posting questions to and responding to questions from another party. The bulletin board may be adapted to enable a party to respond privately or publicly. For example, a client may be able to respond publicly to all lawyers who have shown interest in the matter, e.g., by posting responses on the bulletin board. By making communications public, members may police other members for disclosure of inappropriate content, e.g., direct contact information. A lawyer may be able to respond privately to client, for example, in response to a question about the lawyer credentials or availability. Some embodiments may include a private email system, which may also be adapted to respond to one or many. The terms and conditions signed by all members may indicate that a recipient of inappropriate information, e.g., direct contact information, must bring it to the operator's attention, e.g., else face losing his or her membership to the site.

In some embodiments, the bidding engines 215, 230, 245 and the bidding exchange engine 250 delay publication of or otherwise communicating data until the content is examined automatically for inappropriate information (e.g., direct contact information) or reviewed by a third party, e.g., the operator, for inappropriate information. The third party may review and remove direct contact information that may otherwise circumvent the process. The bidding engines 215, 230, 245 and the bidding exchange engine 250 may be capable of recognizing telephone numbers, email addresses, etc., and may automatically kick back an email with recognized inappropriate content. In some embodiments, the bulletin board may operate substantially as a chat room, with insubstantial delay. In other embodiments, the review may be performed on a regular basis, e.g., daily, every business day, upon receipt of a certain number of entries, or after a certain amount of data (e.g., measured in megabytes), and/or the like. Some embodiments may include automated mechanisms for monitoring and removing inappropriate information, rather than kicking messages back. Other embodiments may depend, in full or in part, on human review.

The status management engine 255 includes hardware, software and/or firmware for displaying the status of a matter. The status may include information defining whether a matter is still available for bidding, e.g., "available," "closed," and/or the like. The status may include indications of the status of the case being handled by the professional. In some embodiment, the status information of a particular matter being handled is viewable only to registered users, or is viewable only to a particular client and the winning professional. Such designations may include, for example, one or more of "case filed on," "deposition scheduled for," "hearing scheduled for," "trial set for," and the like, and may be followed by a date. The status management engine 255 may enable the winning lawyer or winning collector and not the client to input data associated with status. However, some embodiments may enable the client to input status information. In some embodiments, the status management engine 255 may enable the operator to provide status information, e.g., acknowledgment of receipt of the lawyer's or the client's lien documents, filing of the lien with the Secretary of State, etc. In some embodiments, some such status information may be visible or otherwise provided to the lawyer and not to the client, or vice versa. In one embodiment, the status management engine 255 may enable only the operator to modify the status information provided by the operator.

The notification engine 260 includes hardware, software and/or firmware for providing notifications to users. For example, the notification engine 260 may notify professionals of new and/or newly modified matters, added and/or updated matter status, and the like. The notification engine 260 may be adapted to provide notification to the professional via the welcome web page, via email, via the bulletin board, and/or the like.

The search and filter engine 265 includes hardware, software and/or firmware for searching among available matters on which to bid, among the posted matters, among the winning lawyer's or winning collector's pending matters, etc. The search and filter engine 265 may be adapted to filter which matters are available, in full or in part, for lawyers and/or collectors to view. Filtering may include filtering matters by zip code, sets of zip codes, state, or other geographic area (e.g., Northern U.S., Western U.S., Northern Japan, etc.). Filtering may include filtering matters by practice area, subject matter, case category, case sub-category, client, and/or the like. Filter combinations may be possible. Filtering may be advantageous, for example, to assist the lawyer and collector to bid only on matters that they are registered, licensed, and/or otherwise eligible to handle.

In some embodiments, the search and filter engine 265 may be adapted to enable the unregistered lawyer to search posted matters by state, city, and practice area (e.g., "Product Liability") and to obtain a general listing of posted matters. The general listing may include a description of each posted matter without names, direct links to the full matter input data, etc. In other embodiments, the search and filter engine 265 may prevent the professional or possibly just the unregistered professional from viewing certain posted matters. For example, the search and filter engine 265 may preclude the professional from viewing posted matters that the professional is not licensed to handle, outside the professional's practice area, outside a particular subject matter, and/or the like. For example, the search and filter engine 265 may enable judgment matters to be viewable only to collectors (not to lawyers), and pending and prospective litigation matters to be viewable only to lawyers (not to collectors).

In some embodiments, users, e.g., clients, lawyers and/or collectors, whether registered or not, having outstanding issues with the operator may be prevented from navigating to certain web pages, from viewing certain posted information (e.g., matters, status, etc.) until such issues have been resolved. Issues may include a violation or pending investigation of possible violation of the operator's terms and conditions, e.g., posting of any kind of inappropriate material.

The administrative engine 270 includes hardware, software and/or firmware for enabling users to perform various administrative tasks. The administrative engine 270 may be adapted to display content such as frequently asked questions (FAQs), testimonials, the operator's mission statement, and/or the like to the user. The administrative engine 270 may be adapted to display content aimed at assisting the user with technical issues. For example, the administrative engine 270 may be adapted to guide the user through a sequence of web pages that provide technical assistance. The administrative engine 270 may be adapted to provide login information to the registered user who cannot recall his or her login information.

In some embodiments, the administrative engine 270 may provide links to third party web sites, e.g., legal dictionary sites, ethics hotlines of state bar associations, and other web sites that may enable the client to perform due diligence on a bidding professional. The administrative engine 270 may be adapted to link to summary explanations of terms. If the user is posting, for example, a matter in a "Discrimination" category, the user may be asked "Are you suing your employer (Yes/No)?" and then "Are you an at-will employee (Yes/No)?" The administrative engine 270 may highlight the term "at-will employee" and enable the user to click on the term to obtain an explanation of the term.

As the user visits the different web pages, the administrative engine 270 may place copyright notices, disclaimers, advertising (e.g., banner ads), and the like on one or more of the web pages. For example, each web page may include a general disclaimer, such as: "Users of this site understand that we only put clients together with lawyers and collectors. We do not attest to the qualifications nor do we verify the information provided by the lawyers and collectors or the clients. It is up to you to check the history of the particular lawyer or collector you choose or judge the veracity of the client." Following such general disclaimer, the administrative engine 270 may provide a link to state bar association web sites to enable the user to perform due diligence on the lawyer, such as check on a lawyer's disciplinary record.

The rating engine 275 includes hardware, software and/or firmware for enabling the client to provide rating information on the winning professional. The rating may indicate responsiveness, timeliness, relationship developed, time elapsed to complete the matter, whether the client changed winning professional following the client's initial selection and, if so, why, etc. In one embodiment, the rating engine 275 is adapted to provide the client's rating to the lawyer or collector registration engines 220, 235 to be appended to the lawyer's or collector's profile. In some embodiments, the rating engine 275 may enable the lawyer or collector to comment on the rating.

In one embodiment, the rating engine 275 may prompt the client to select a rating from a predetermined set of ratings. Predetermined ratings may include one star, two stars, etc., or a number in a scale, e.g., any number from 1 to 10. In another embodiment, the rating engine 275 prompts the client to input free form text. In yet other embodiments, the rating engine 275 may be adapted for either or both predetermined ratings and text input.

The translation engine 280 includes hardware, software and/or firmware for translating content. The translation engine 280 may translate (or attempt to translate) data from one language to another language prior to storing the data on the web server 105 or otherwise making the received data available for processing.

It will be appreciated that some users may be registered as, for example, both lawyer and user. An example is a registered lawyer with a matter for an ethics attorney. For such matter, the registered lawyer is the prospective client. In some embodiments, such users may need to register twice, and may have separate accounts and profiles. In other embodiments, such users may be able to register as both lawyer and user via a single profile and account.

Figure 3:
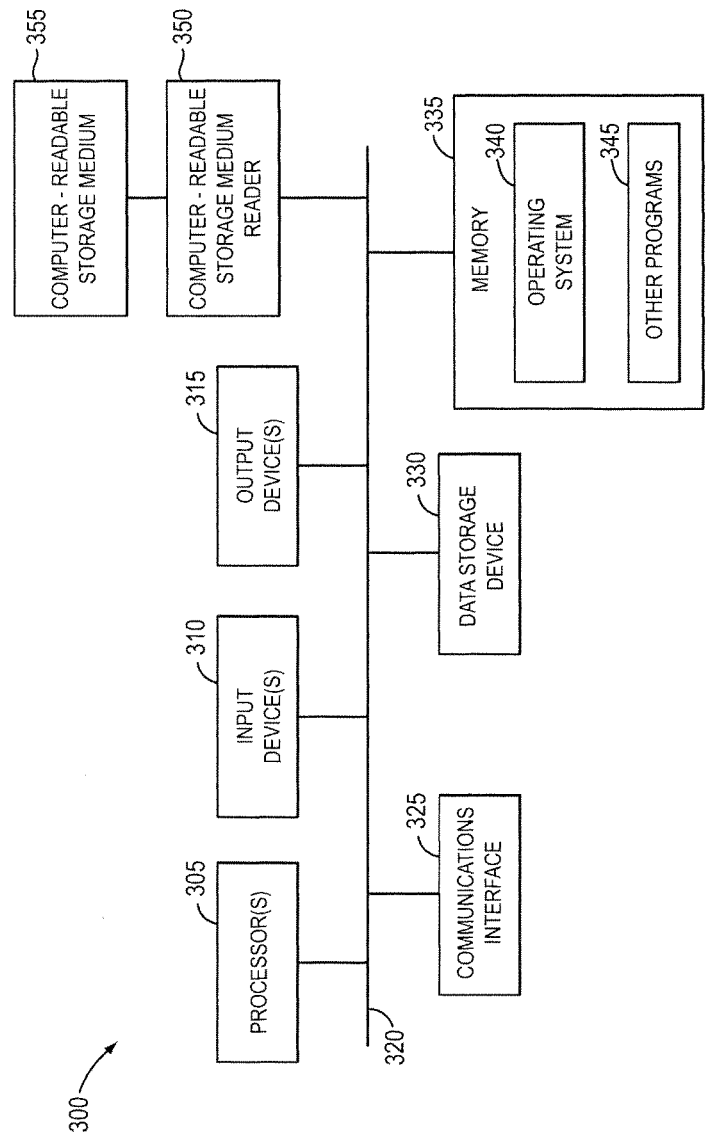
FIG. 3 is a block diagram illustrating details of a computer system, in accordance with an embodiment of the present invention.

FIG. 3 is a block diagram illustrating details of a computer system 300, in accordance with an embodiment of the present invention. Each of the server system 105, server system 165, client system 120, lawyer system 135, and collector system 150 may be an instance of the computer system 300. Computer system 300 includes a processor 305, such as an Intel or AMD microprocessor, coupled to a communications channel 320. The computer system 300 further includes an input device 310 such as a keyboard or mouse, an output device 315 such as a cathode ray tube display, a communications device 325, a data storage device 330 such as a magnetic disk, and memory 335 such as random-access memory (RAM), each coupled to the communications channel 320. The communications interface 325 may be coupled to a network such as the computer network 115. One skilled in the art will recognize that, although the data storage device 330 and memory 335 are illustrated as different units, the data storage device 330 and memory 335 may be parts of the same unit, distributed units, virtual memory, etc.

The data storage device 330 and/or memory 335 may store an operating system 340 such as the Microsoft Windows Vista, Linux, the IBM OS/2 operating system, the MAC OS, or UNIX operating system and/or other programs 345. It will be appreciated that embodiments may be implemented on platforms and operating systems other than those mentioned. An embodiment may be written using JAVA, C, and/or C++ language, or other programming languages, possibly using object oriented programming methodology. The OS 130, 145 and/or 160 may include the operating system 340.

One skilled in the art will recognize that the computer system 300 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 350 such as a magnetic disk drive, hard disk drive, magneto-optical reader, central processing unit (CPU), etc. may be coupled to the communications bus 320 for reading a CRSM 355 such as a magnetic disk, a hard disk, a magneto-optical disk, RAM, etc. Accordingly, the computer system 300 may receive programs and/or data via the CRSM reader 350. Further, it will be appreciated that the term "memory" herein is intended to cover all data storage media whether permanent or temporary.

Figure 4:
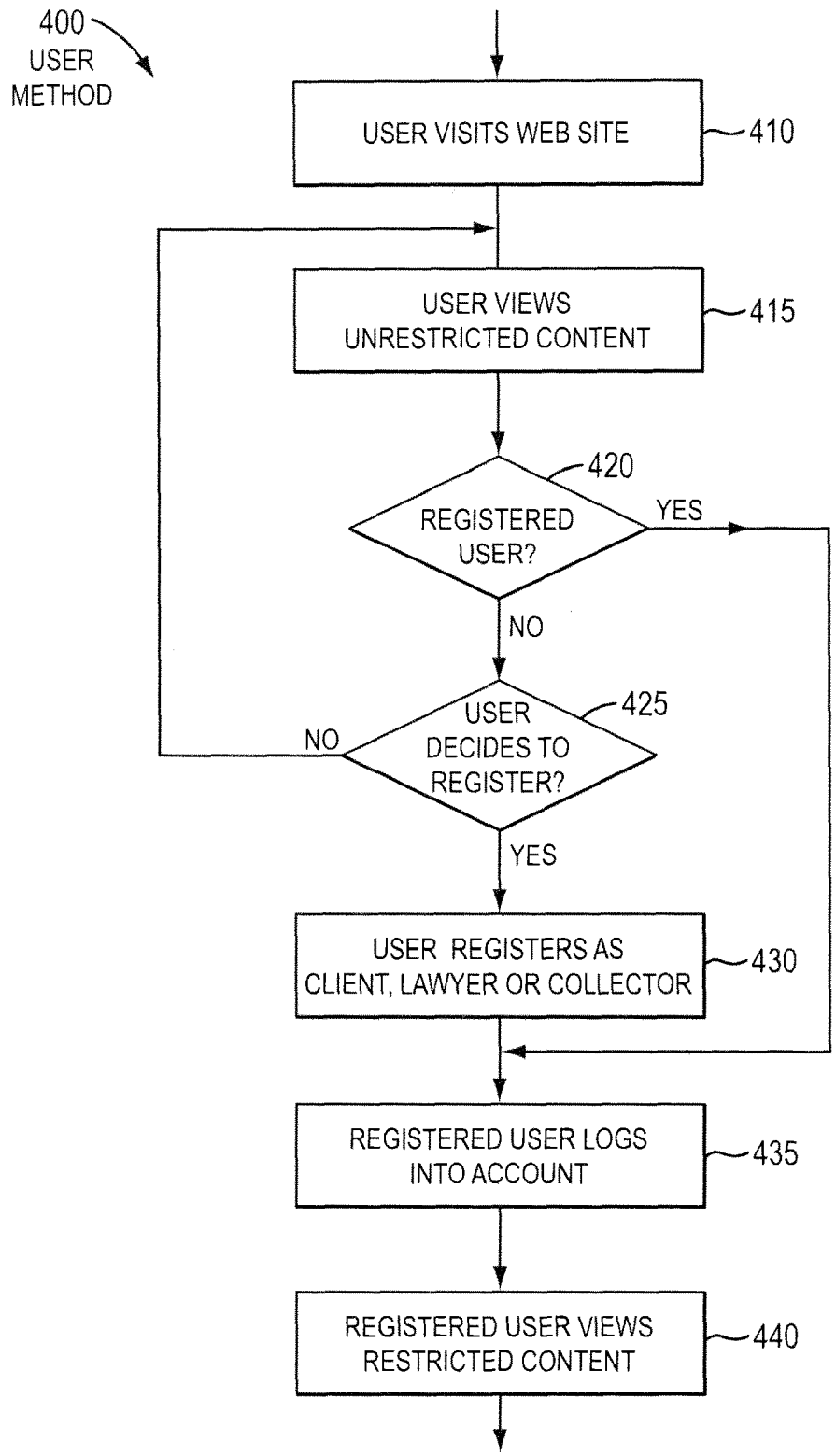
FIG. 4 is a flow diagram illustrating an example method for enabling a user to navigate a web site offering matter bidding, e.g., contingency matter bidding, in accordance with an embodiment of the present invention.

FIG. 4 is a flow diagram illustrating an example method 400 for enabling a user to navigate a website offering matter bidding, in accordance with an embodiment of the present invention. The method 400 starts at step 410, when a user accesses the web server 200, via a web page. The user may be anyone, such as a registered or unregistered client, lawyer or collector. At step 415, the web server 200 provides the user with unrestricted content only. Unrestricted content may include the general listing of posted matters, mission statement, FAQs, administrative functions, and similar content. The web server 200 may also provide the user with the option to login as a registered user or to register.

At step 420, a user, who is registered, may decide to proceed to step 435 to login. Verification of login information may be performed by the client, lawyer, or collector registration engine 210, 225, 240. Upon successful login, the web server 200 at step 440 presents the registered user with restricted content (as well as unrestricted content). Restricted content may include full matter input data of posted matters, matters available for bidding to the registered lawyer and/or the registered collector, notifications, etc. At step 425, if the unregistered user decides to register, the client, lawyer, or collector registration engine 210, 225, 240 prompts the user to input data as described with reference to FIG. 2. Some users may decide, at step 425, not to register at this point in time. For such users, the method 400 returns to step 415, enabling the user to continue viewing unrestricted content.

Figure 5:
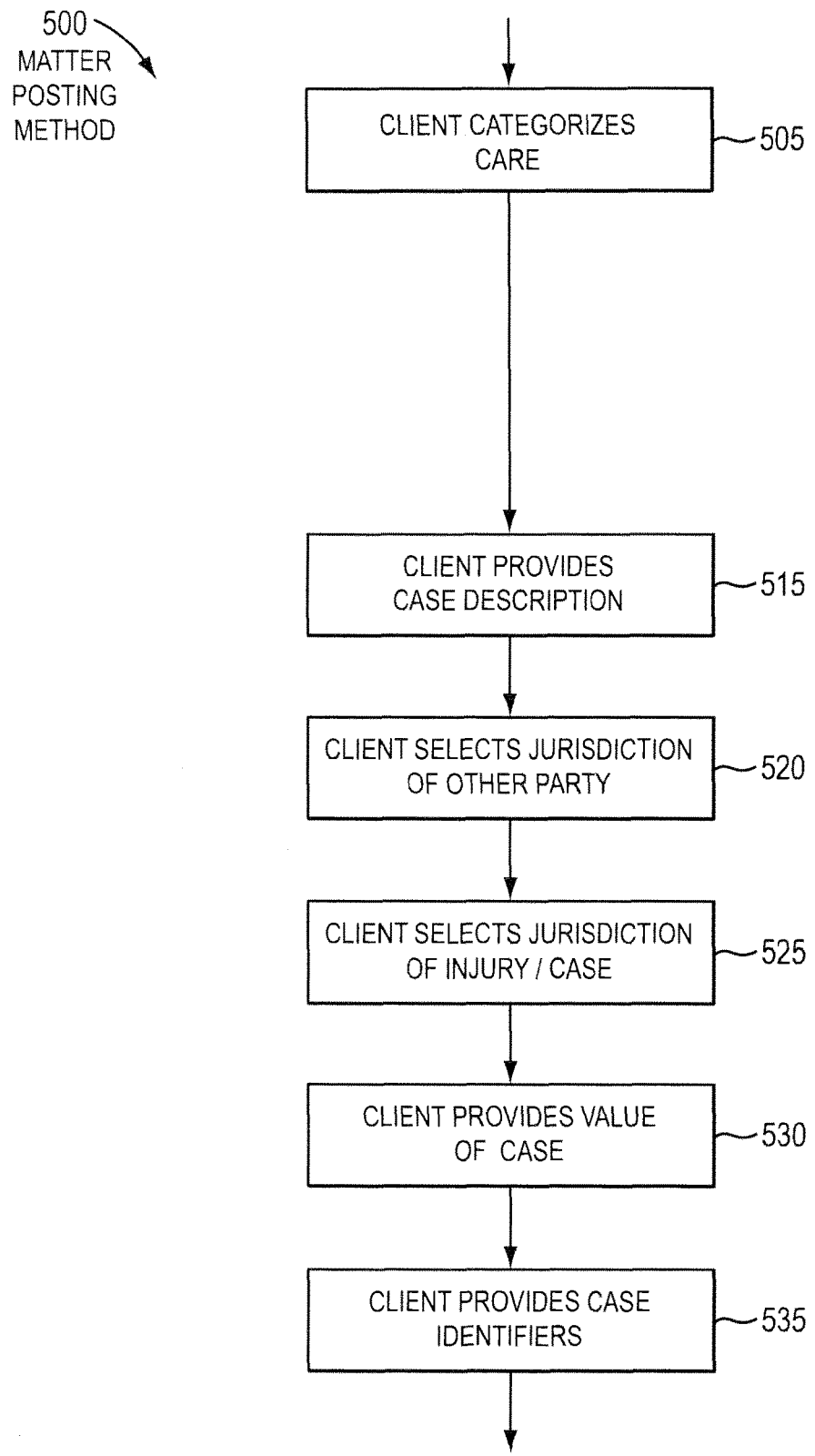
FIG. 5 is a flow diagram illustrating an example method of posting a matter by a client, in accordance with an embodiment of the present invention.

FIG. 5 is a flow diagram illustrating an example method 500 of posting a matter by a client, in accordance with an embodiment of the present invention. At step 505, the client matter engine 215 prompts the client to categorize the case. In one embodiment, the client matter engine 215 enables the client to select from predefined case categories in layman's terminology. For example, case categories may be defined as "Dog bite" rather than the more legal terminology "Tort action." The client matter engine 215 may enable the client to select from one or more sub-categories. It will be appreciated that some case categories may include one or more hierarchies of sub-categories, whereas other case categories may include no sub-categories.

At step 515, the client matter engine 215 prompts the user to input a case description. The case description may include free form text. The client matter engine 215 prompts the client to select at step 520 a jurisdiction of the other party, and at step 525 a jurisdiction in which the injury or case arose. The jurisdiction may be predefined, such as "Alabama," "Arizona," etc. The jurisdiction may also include an "Other" selection, which may prompt the user to input the jurisdiction in free form text. Such selection may, for example, be used for cases arising outside the United States (e.g., Canada), in a U.S. territory (e.g., Guam, Puerto Rico), or the like. The jurisdiction may also include a "Don't know" or "Unknown" or similar designation. In one embodiment, the client matter engine 215 does not require the user to input a jurisdiction selection. In another embodiment, the client matter engine 215 is adapted not to prompt the user for any jurisdiction information. In some embodiments, the client matter engine 215 may request the client to enter, as part of the case description, why the client thinks a group of matters may be more efficient for an attorney to handle as a group instead of individually. For example, the client matter engine 215 may request the client to enter whether the group of cases involve: researching of common legal issues, interfacing with common adverse parties, resolving common case management issues, discovery of common documents, investigation and/or presentation of common witnesses, interfacing with common judges, use of common expenditures, and other prospects that allow the group of matters to be handled more cost effectively than the individual matters in the group.

At step 530, the client matter engine 215 prompts the user to input an estimated value of the matter. In some embodiments, the value may be selected from a set of predefined values, e.g., ranges. An example may be "Less than $10,000," "$10,000-25,000," etc. In some embodiments, the user may input the value in free form text. The free form text may enable the client to input only numbers (e.g., "1275") or any character and numbers (e.g., "$1275 Canadian"). In some embodiments, the client matter engine 215 may enable the client to elect whether to provide the value from a predefined list or as free form text. At step 535, the client matter engine 215 prompts the client to input one or more case identifiers.

Figure 6:
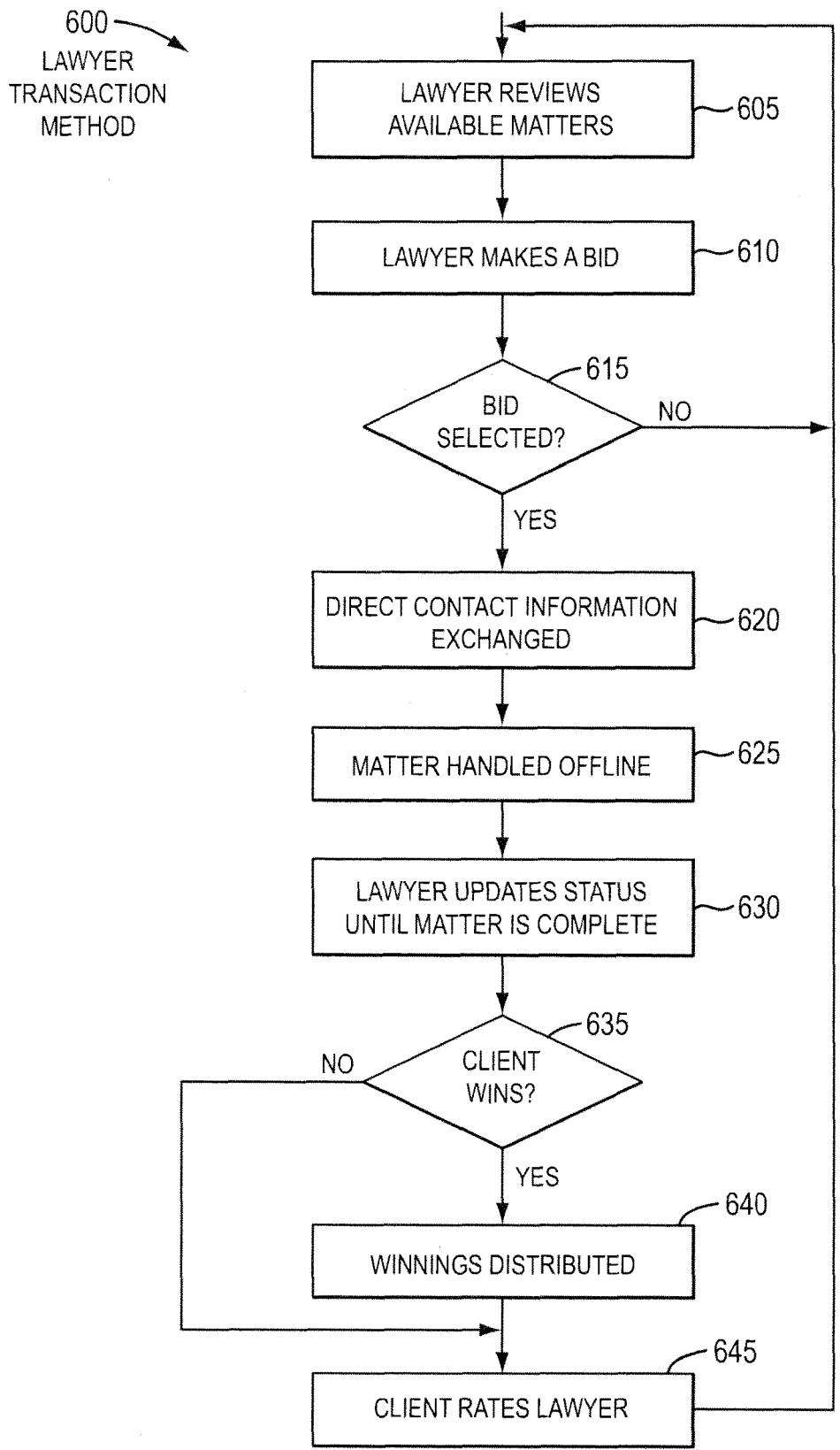
FIG. 6 is a flow diagram illustrating an example method of bidding on and handling a contingency transaction by a lawyer, in accordance with an embodiment of the present invention.

FIG. 6 is a flow diagram illustrating an example method 600 of bidding and handling a contingency transaction by a lawyer, in accordance with an embodiment of the present invention. The method 600 begins at step 605 with the lawyer bidding engine 230 and the search and filter engine 265 enabling the lawyer to review available matters on which to bid. In one embodiment, the client via the client matter engine 215 and the bidding exchange engine 250 and the lawyer via the lawyer bidding engine 230 and the bidding exchange engine 250 engage in discussion to assist the lawyer to decide whether to bid. The bidding process is described in further detail with reference to FIG. 8.

At step 610, the lawyer uses the lawyer bidding engine 230 to bid on a matter. At step 615, the client matter engine 215 enables the client to select from the available bids. If no bid is selected, method 600 returns to step 605 to await additional bids. If a bid is selected, then in step 620 the client and winning lawyer direct contact information is exchanged. Each may be provided with, for example, one or more of the other's phone number, fax number, email address, mailing address, and/or the like. In one embodiment, the bidding exchange engine 250 posts a private message to the bulletin board to exchange the information. In another embodiment, the status management engine 255 posts a status of the matter indicating the winning professional. In another embodiment, the notification engine 260 sends an email to the winning professional. Any notification mechanism may be used.

During step 625, the client and lawyer work on the matter pursuant to the operator's terms and conditions. Such work may take place offline. On a regular basis, at step 630, the lawyer (and/or another party, e.g., the client, the operator, a third party, and/or the like) via the status management engine 255 may update the status of the matter. Step 630 may be repeated until the matter is completed. The matter may be completed in various ways. Examples of completion include settlement, jury verdict, charges dropped, agreement not to pursue the matter further, and/or the like. At step 635, upon completion of the matter, a determination is made whether the client won, e.g., whether the client will obtain any remuneration. In one embodiment, the status management engine 255 prompts the lawyer to post this determination. If the client lost, according to the operator's terms and conditions, no payment is due to the lawyer or the operator. In step 645, the client via the rating engine 275 rates the lawyer. Method 600 returns to step 605. If the client won, according to the operator's terms and conditions, the lawyer in step 640 distributes the winnings per the terms and conditions. The client in step 645 then rates the lawyer. Method 600 then returns to step 605.

In some embodiments, the client and/or lawyer may decide to discontinue their relationship prior to completion of the matter. In such embodiments, the method 600 may include using the status management engine 255 to change the status of the matter to "open" or the like. A new bidding process with other lawyers may begin. In the event that the relationship is discontinued due to allegations of failure to comply with the operator's terms and conditions or other misconduct, the operator may terminate or freeze the client or lawyer account until the operator investigates.

Figure 7:
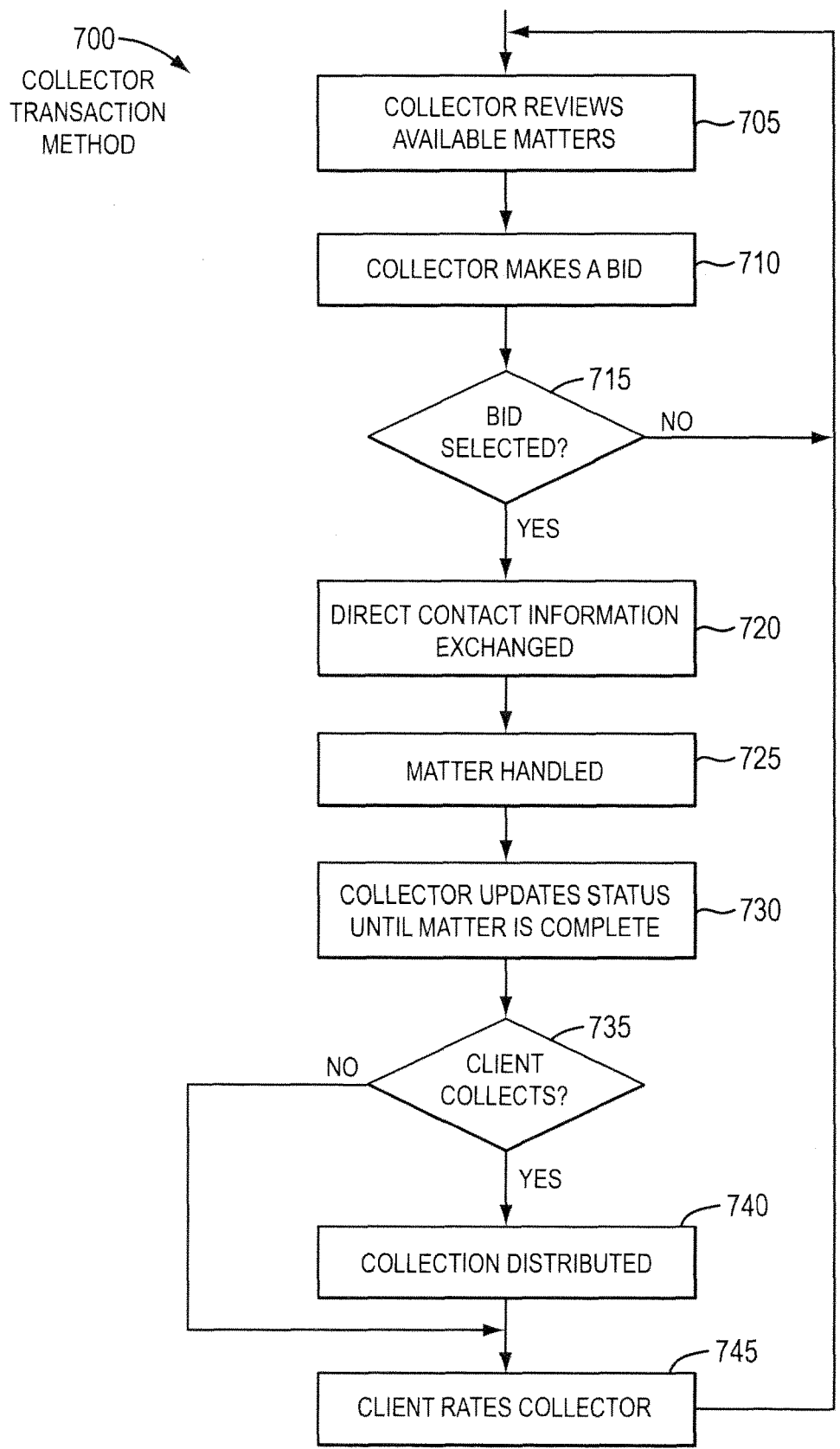
FIG. 7 is a flow diagram illustrating an example method of bidding on and handling a contingency transaction by a collector, in accordance with an embodiment of the present invention.

FIG. 7 is a flow diagram illustrating an example method 700 of bidding and handling a contingency transaction by a collector, in accordance with an embodiment of the present invention. The method 700 begins at step 705 with the collector bidding engine 245 and the search and filter engine 265 enabling the collector to review available matters on which to bid. In one embodiment, the client via the client matter engine 215 and the bidding exchange engine 250 and the collector via the collector bidding engine 245 and the bidding exchange engine 250 engage in discussion to assist the collector to decide whether to bid.

At step 710, the collector uses the collector bidding engine 245 to bid on a matter. At step 715, the client matter engine 215 enables the client to select from the available bids. If no bid is selected, method 700 returns to step 705 to await additional bids. If a bid is selected, then in step 720 the client and winning collector direct contact information is exchanged. Each may be provided with, for example, one or more of the other's phone number, fax number, email address, mailing address, and/or the like. In one embodiment, the bidding exchange engine 250 posts a private message to the bulletin board to exchange the information. In another embodiment, the status management engine 255 posts a status of the matter indicating the winning professional. In another embodiment, the notification engine 260 sends an email to the winning professional. Any notification mechanism may be used. In another embodiment, the client may be informed first of the lawyer's direct contact information so that the client can conduct initial diligence on the lawyer, e.g., to confirm good standing with the bar, no felony convictions, proper licensing, etc.

During step 725, the client and collector work on the matter pursuant to the operator's terms and conditions. Such work may take place offline. On a regular basis, at step 730, the collector (and/or another party, e.g., the client, the operator, a third party, and/or the like) via the status management engine 255 may update the status of the matter. Step 730 may be repeated until the matter is completed. The matter may be completed in various ways. Examples of completion include settlement, agreement not to pursue the matter further, complete remuneration, and/or the like. At step 735, upon completion of the matter, a determination is made whether the client collected credit due. In one embodiment, the status management engine 255 prompts the collector to post this determination. If the client lost, according to the operator's terms and conditions, no payment is due to the collector or the operator. In step 745, the client via the rating engine 275 rates the collector. Method 600 returns to step 605. If the client won, according to the operator's terms and conditions, the collector in step 740 distributes the collections per the terms and conditions. The client in step 645 then rates the collector. Method 600 then returns to step 605.

In some embodiments, the client and/or collector may decide to discontinue their relationship prior to completion of the matter. In such embodiments, the method 700 may include using the status management engine 255 to change the status of the matter to "open" or the like. A new bidding process with other collectors may begin. In the event that the relationship is discontinued due to allegations of failure to comply with the operator's terms and conditions or other misconduct, the operator may terminate or freeze the client or collector account until the operator investigates.

Figure 8:
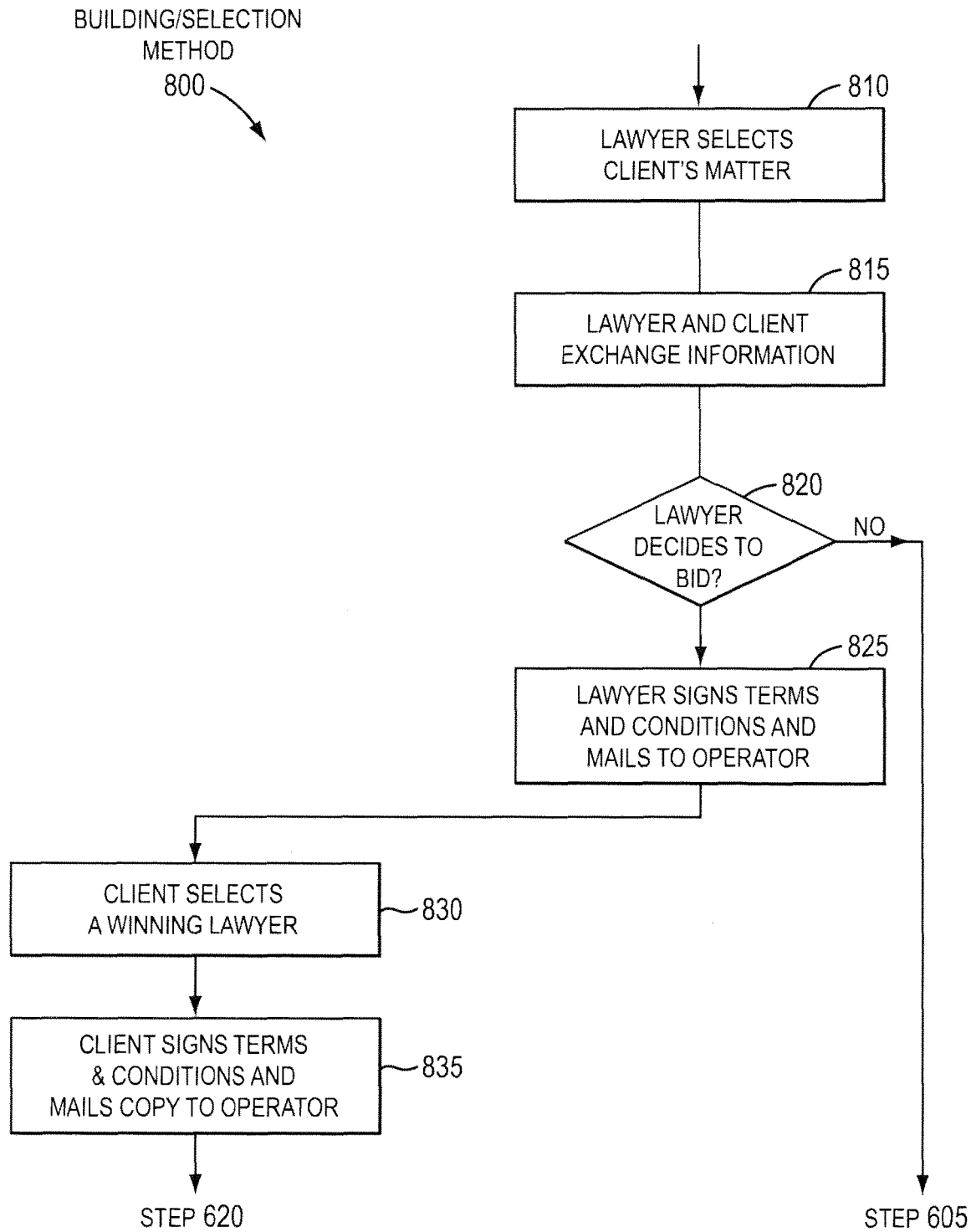
FIG. 8 is a flow diagram illustrating an example method of bidding on a contingency matter by a lawyer and selecting a lawyer by a client, in accordance with an embodiment of the present invention.

FIG. 8 is a flow diagram illustrating an example method 800 of bidding on a matter by a lawyer and selecting a lawyer by a client, in accordance with an embodiment of the present invention. The method 800 may be an exemplary implementation of the bidding process step 610 and lawyer selection process 615 of FIG. 6. The method 800 may be similar for bidding on a matter by a collector and selecting a collector by a client.

In one embodiment, the lawyer may be interested in bidding on one or more available matters. At step 810, using the lawyer bidding engine 215, the lawyer selects the matter. At step 815, the client matter engine 215, lawyer bidding engine 230 and bidding exchange engine 250 enable the lawyer and client to exchange information, possibly subject to third party screening, such as by the operator, to remove direct contact information.

If the lawyer so decides, the lawyer bidding engine 230 in step 820 enables the lawyer to bid on the matter. If the lawyer decides not to bid on the matter, the method 800 proceeds to step 605 of FIG. 6. If the lawyer decides to bid on the matter, the lawyer bidding engine 230 and/or the administrative engine 270 in step 825 prompts the lawyer to sign the terms and conditions, possibly for a second or other time, and to mail/email the signed document to the operator. At step 830, the client may select a bid from the bids received. At step 835, the client matter engine 215 and/or the administrative engine 270 prompts the client to sign the operator's terms and conditions and to mail/email the signed document to the operator. The method 800 then proceeds to step 620 of FIG. 6. In some embodiments, at step 830, the client may decide not to select a lawyer. The client may, for example, decide to abandon or postpone pursuing the matter. If so, the method 800 may instead proceed to step 605 of FIG. 6. Other variations are possible.

Figure 9:
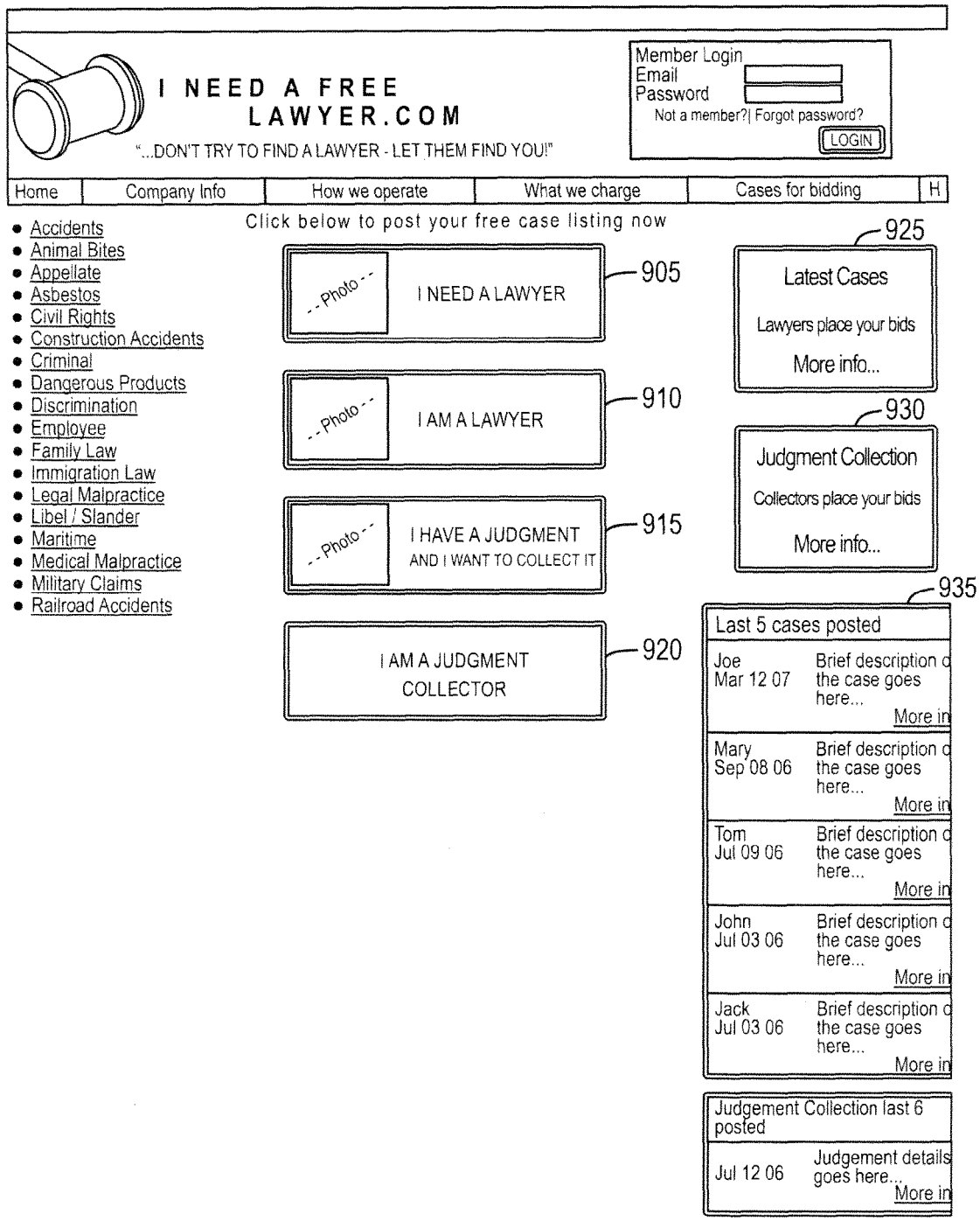
FIG. 9 is a screen-shot illustrating an example user interface for accessing the bidding web site, in accordance with an embodiment of the present invention.

FIG. 9 is a screen-shot illustrating an example user interface 900 for accessing the bidding web site, in accordance with an embodiment of the present invention. User interface 900 may be generated by the server system 105, e.g., by the web server 200. The user interface 900 includes multiple hyperlinks (or "buttons"), i.e., areas on the web page which, when activated using an input device 310 (e.g., clicked with a mouse), may link or otherwise navigate to a different web page. The user interface 900 includes an I-Need-A-Lawyer button 905, an I-Am-A-Lawyer button 910, an I-Have-A-Judgment button 915, an I-Am-A-Judgment-Collector button 920, a Latest-Cases button 925, a Judgment-Collection button 930, and a Last-5-Cases-Posted button 935.

The I-Need-A-Lawyer button 905 and the I-Have-A-Judgment button 915 links the client to one or more web pages to enable the client to post a matter using the client matter engine 215. The buttons 905 and 915 may, in some embodiments, link the client to the same web page and in other embodiments to different web pages (e.g., one web page tailored to posting matters on which lawyers may bid and another web page tailored to posting matters on which collectors may bid). Depending on whether the user is registered or not, the web buttons 905, 915 may link to web pages guiding the user through a registration process.

The I-Am-A-Lawyer button 910 links the lawyer to one or more web pages to enable the lawyer to view and bid on posted matters. Depending on whether the lawyer is registered or not, the web button 910 may link to web pages guiding the lawyer through a registration process.

The I-Am-A-Judgment-Collector button 920 links the collector to one or more web pages to enable the collector to view and bid on posted judgment matters. Depending on whether the collector is registered or not, the web button 920 may link to web pages guiding the collector through a registration process.

The Latest-Cases button 925 may link the lawyer to a login page for registered lawyers, to a web page for registered and unregistered lawyers to view summary information about the latest matters posted by clients, etc.

The Judgment-Collection button 930 may link the collector to a login page for registered collectors, to a web page enabling registered and unregistered collectors to view summary information about the latest judgment matters posted by clients, etc.

The Last-5-Cases-Posted button 935 enables registered lawyers and registered collectors to login and view information about the five most recent matters posted. In some embodiments, the Last-5-Cases-Posted button 935 may enable any user, whether registered or not and whether a lawyer or collector or not, to view a general listing of the five most recent matters posted. Other relationships between the buttons on the user interface 900 and the web pages to which they link are possible.

FIG. 12 is a screen-shot illustrating an example user interface 1400 for registering a lawyer, in accordance with an embodiment of the present invention. The user interface 1400 includes three membership types, namely silver membership 1205 (enabling reviewing cases, exchanging information with clients posting matters, and bidding on matters), gold membership 1210 (enabling silver member benefits plus an extended sheet to detail cases won), and platinum membership 1215 (enabling gold member benefits plus automatic emails when a new case is posted that fits the lawyer's profile). The lawyer may select and pay membership, possibly for more than one registrant. For example, in one embodiment, the membership may include two or more lawyer registrants, for example, for attorneys in the same law firm. Some embodiments may include a law firm membership, individual attorney memberships, other group memberships, or any combination thereof.

Figure 13:
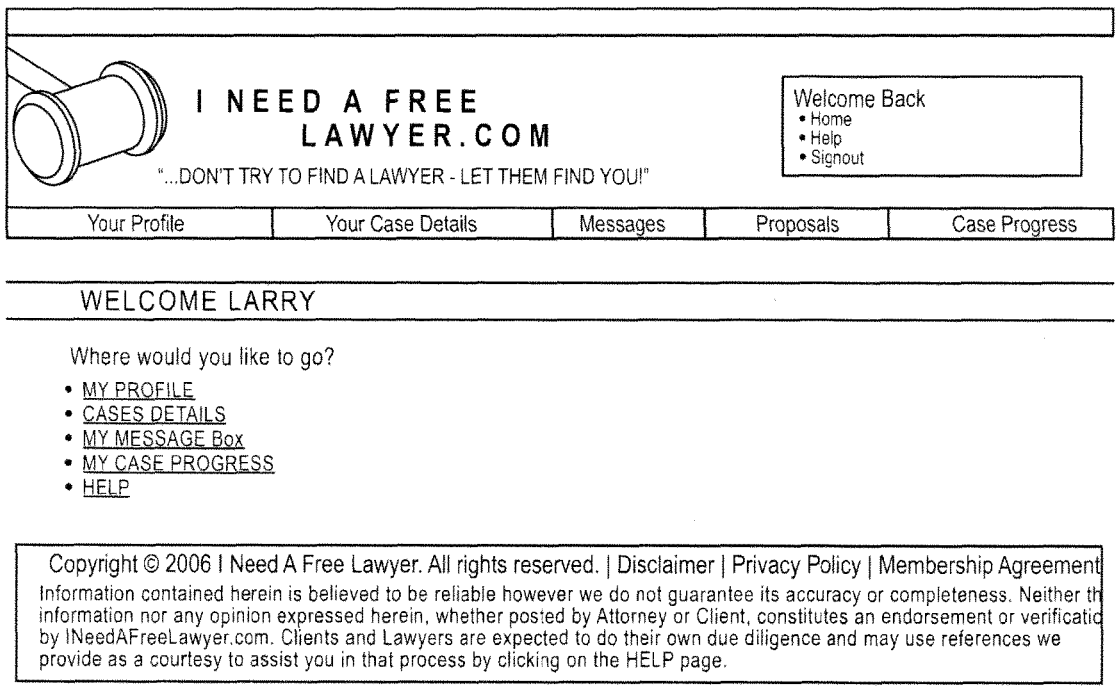
FIG. 13 is a screen-shot illustrating an example home page for a client, lawyer or collector, in accordance with an embodiment of the present invention.

FIG. 13 is a screen-shot illustrating an example home page for a user, e.g., client, lawyer or collector, in accordance with an embodiment of the present invention. By selecting "My Profile," the user may view and/or edit the profile (e.g., using the client registration engine 205 or lawyer registration engine 220 or collector registration engine 235 in conjunction with the administrative engine 270). By selecting "Case Details," the client may view and/or edit matter input data, or the lawyer/collector may view matter input data. The "My Message Box" enables the user, e.g., using the bidding exchange engine 250, to view messages from others, e.g., clients, lawyers and/or collectors. The "My Case Progress" enables the client to view status information on posted and/or pending matters (e.g., including posts, bids, a flag indicating whether the bidding professional has submitted necessary documents such as the signed terms and conditions, etc.) using the status management engine 255, and the lawyer/collector to view posted matters and to view and/or edit status information on pending matters using the status management engine 255. The "Help" selection links the user, e.g., client, using the administrative engine 270, to administrative web pages including content such as FAQs, technical tips, and the like. In some embodiments, the lawyer and/or collector may additionally be able to use, respectively, the lawyer and/or collector registration engines 225, 240 to view account status, e.g., membership expiration, fees due, etc. In some embodiments, the lawyer and/or collector may also be able to use the status management engine 255 to view the status of signed terms and conditions documents submitted to the operator, e.g., including the status of recording of any lien included among such documents.

FIG. 14 is a screen-shot illustrating an example user interface 1400 for some administrative functions of the web server 200, in accordance with an embodiment of the present invention. Using the administrative engine 270, the user interface 1400 enables the user to submit or obtain information pertaining to technical questions 1405, content questions 1410, and legal questions 1415. Technical questions 1405 may be separated into multiple links, such as one link for general technical questions, one for problems with login information, one for "I forgot my password," and yet another one for "I forgot my username."

The user interface 1400 may include helpful tools, such as a legal dictionary 1420 and a lawyer check tool 1425. The administrative engine 270 may be adapted to provide the legal dictionary 1420 by linking to one or more third party web sites. The lawyer check tool 1425 may, for example, link to a particular jurisdiction's bar association in response to the selection of particular jurisdiction. Other administrative functions may be included in such user interfaces 1400.

In some embodiments, one or more of the user interfaces may include member login fields to enable member login or log out, a link to FAQs, a link to one or more technical support email addresses (e.g., support@INeedAFreeLawyer.com), a link to terms and conditions, a link to policies (such as the privacy policy), etc.

The foregoing description of the preferred embodiments of the present invention is by way of example only, and other variations and modifications of the above-described embodiments and methods are possible in light of the foregoing teaching. Although the web pages are being described as separate and distinct web pages, one skilled in the art will recognize that these web pages may be a part of an integral web server, may each include portions of multiple web servers, or may include combinations of single and multiple web servers. Similarly, although the client, lawyer, and collector systems are being described as separate and distinct computer systems, one skilled in the art will recognize that these systems may be a part of a single computer system and may each include portions and/or combinations of multiple computer systems. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system comprising:
one or more computing devices, each computing device including one or more processors and memory, the memory storing computer-executable instructions that, when executed, cause the one or more computing devices to perform a method comprising:
generating a group contingency-matter bidding web site, the group contingency-matter bidding web site associated with a third party entity;
posting through the group contingency-matter bidding web site a plurality of groups of two or more contingency-based related matters, each group of the plurality of groups associated with one or more clients of a plurality of clients;
displaying through the group contingency-matter bidding web site the plurality of groups of two or more contingency-based related matters;
receiving through the group contingency-matter bidding web site a plurality of bids to handle a particular group of the plurality of groups of two or more contingency-based related matters, each bid of the plurality of bids associated with one or more contingency professionals of a plurality of contingency professionals, the particular group of the plurality of groups of two or more contingency-based related matters comprising a group of legal matters involving any of a common legal subject matter, a common adverse party, and a common judge;
displaying through the group contingency-matter bidding web site the plurality of bids to handle the particular group of the plurality of groups of two or more contingency-based related matters;
selecting through the group contingency-matter bidding web site a particular one or more contingency professionals of the plurality of contingency professionals to handle the particular group of the plurality of groups of two or more contingency-based related matters;
providing through the group contingency-matter bidding web site communications between the particular one or more contingency professionals and the one or more clients associated with the particular group of the plurality of groups of two or more contingency-based related matters; and
removing any personal identifiable information from the communications until both the particular one or more contingency professionals and the one or more clients associated with the particular group of the plurality of groups of two or more contingency-based related matters have executed one or more agreements with the third party entity, the one or more agreements specifying at least that the third party entity will obtain its fees out of any value obtained from an outcome of the particular group of the plurality of groups of two or more contingency-based related matters.

2. The system of claim 1 wherein the particular group of two or more contingency-based related matters comprises a set of matters that are not cost-effective for the particular one or more contingency professionals to handle individually but are cost-effective for the particular one or more contingency professionals to handle together.

3. The system of claim 1 wherein the particular group of two or more contingency-based related matters comprises a particular group of legal matters.

4. The system of claim 1 wherein the particular group of two or more contingency-based related matters involves researching of common legal issues.

5. The system of claim 1 wherein the particular group of two or more contingency-based related matters involves interfacing with common adverse parties.

6. The system of claim 1 wherein the particular group of two or more contingency-based related matters involves resolving common case management issues.

7. The system of claim 1 wherein the particular group of two or more contingency-based related matters involves discovery of common factual issues, witnesses, or documents.

8. The system of claim 1 wherein the particular group of two or more contingency-based related matters involves investigation or presentation of common witnesses.

9. The system of claim 1 wherein the particular group of two or more contingency-based related matters involves interfacing with common judges.

10. The system of claim 1 wherein the particular group of two or more contingency-based related matters involves use of common expenditures.

11. A method comprising:
generating a group contingency-matter bidding web site, the group contingency-matter bidding web site associated with a third party entity;
posting through the group contingency-matter bidding web site a plurality of groups of two or more contingency-based related matters, each group of the plurality of groups associated with one or more clients of a plurality of clients;
displaying through the group contingency-matter bidding web site the plurality of groups of two or more contingency-based related matters;
receiving through the group contingency-matter bidding web site a plurality of bids to handle a particular group of the plurality of groups of two or more contingency-based related matters, each bid of the plurality of bids associated with one or more contingency professionals of a plurality of contingency professionals, the particular group of the plurality of groups of two or more contingency-based related matters comprising a group of legal matters involving any of a common legal subject matter, a common adverse party, and a common judge;
displaying through the group contingency-matter bidding web site the plurality of bids to handle the particular group of the plurality of groups of two or more contingency-based related matters;
selecting through the group contingency-matter bidding web site a particular one or more contingency professionals of the plurality of contingency professionals to handle the particular group of the plurality of groups of two or more contingency-based related matters;
providing through the group contingency-matter bidding web site communications between the particular one or more contingency professionals and the one or more clients associated with the particular group of the plurality of groups of two or more contingency-based related matters; and
removing any personal identifiable information from the communications until both the particular one or more contingency professionals and the one or more clients associated with the particular group of the plurality of groups of two or more contingency-based related matters have executed one or more agreements with the third party entity, the one or more agreements specifying at least that the third party entity will obtain its fees out of any value obtained from an outcome of the particular group of the plurality of groups of two or more contingency-based related matters.

12. The method of claim 11 wherein the particular group of two or more contingency-based related matters comprises a set of matters that are not cost-effective for the particular one or more contingency professionals to handle individually but are cost-effective for the particular one or more contingency professionals to handle together.

13. The method of claim 11 wherein the particular group of two or more contingency-based related matters comprises a particular group of legal matters.

14. The method of claim 11 wherein the particular group of two or more contingency-based related matters involves researching of common legal issues.

15. The method of claim 11 wherein the particular group of two or more contingency-based related matters involves interfacing with common adverse parties.

16. The method of claim 11 wherein the particular group of two or more contingency-based related matters involves resolving common case management issues.

17. The method of claim 11 wherein the particular group of two or more contingency-based related matters involves discovery of common factual issues, witnesses, or documents.

18. The method of claim 11 wherein the particular group of two or more contingency-based related matters involves investigation or presentation of common witnesses.

19. The method of claim 11 wherein the particular group of two or more contingency-based related matters involves interfacing with common judges.

20. The method of claim 11 wherein the particular group of two or more contingency-based related matters involves use of common expenditures.

21. A non-transitory computer storage medium storing computer-executable instructions that, when executed, cause a computer system to perform a computer-implemented method comprising:
generating a group contingency-matter bidding web site, the group contingency-matter bidding web site associated with a third party entity;
posting through the group contingency-matter bidding web site a plurality of groups of two or more contingency-based related matters, each group of the plurality of groups associated with one or more clients of a plurality of clients;
displaying through the group contingency-matter bidding web site the plurality of groups of two or more contingency-based related matters;
receiving through the group contingency-matter bidding web site a plurality of bids to handle a particular group of the plurality of groups of two or more contingency-based related matters, each bid of the plurality of bids associated with one or more contingency professionals of a plurality of contingency professionals, the particular group of the plurality of groups of two or more contingency-based related matters comprising a group of legal matters involving any of a common legal subject matter, a common adverse party, and a common judge;
displaying through the group contingency-matter bidding web site the plurality of bids to handle the particular group of the plurality of groups of two or more contingency-based related matters;
selecting through the group contingency-matter bidding web site a particular one or more contingency professionals of the plurality of contingency professionals to handle the particular group of the plurality of groups of two or more contingency-based related matters;
providing through the group contingency-matter bidding web site communications between the particular one or more contingency professionals and the one or more clients associated with the particular group of the plurality of groups of two or more contingency-based related matters; and removing any personal identifiable information from the communications until both the particular one or more contingency professionals and the one or more clients associated with the particular group of the plurality of groups of two or more contingency-based related matters have executed one or more agreements with the third party entity, the one or more agreements specifying at least that the third party entity will obtain its fees out of any value obtained from an outcome of the particular group of the plurality of groups of two or more contingency-based related matters.

\* \* \* \* \*